United States Patent [19]
Gotoh

[11] Patent Number: 6,079,824
[45] Date of Patent: Jun. 27, 2000

[54] INK-JET PRINTING APPARATUS FOR PRINTING WITH A PLURALITY KINDS OF SAME COLOR TYPE INKS HAVING DIFFERENT DENSITY

[75] Inventor: Fumihiro Gotoh, Kawasaki, Japan

[73] Assignee: Canon Kabushiki Kaisha, Tokyo, Japan

[21] Appl. No.: 08/773,132

[22] Filed: Dec. 26, 1996

[30] Foreign Application Priority Data

Dec. 29, 1995 [JP] Japan .................................. 7-354209

[51] Int. Cl.[7] .......................... G01D 11/00; B41J 29/38; B41J 2/205
[52] U.S. Cl. ................................. 347/100; 347/14; 347/15
[58] Field of Search ............................. 347/15, 100, 43, 347/12, 14

[56] References Cited

U.S. PATENT DOCUMENTS

| | | | |
|---|---|---|---|
| 4,313,124 | 1/1982 | Hara ............................................ | 347/57 |
| 4,345,262 | 8/1982 | Shirato et al. ............................. | 347/10 |
| 4,459,600 | 7/1984 | Sato et al. ................................... | 347/47 |
| 4,463,359 | 7/1984 | Ayata et al. ................................. | 347/56 |
| 4,558,333 | 12/1985 | Sugitani et al. ........................... | 347/65 |
| 4,608,577 | 8/1986 | Hori ............................................ | 347/66 |
| 4,723,129 | 2/1988 | Endo et al. ................................. | 347/56 |
| 4,740,796 | 4/1988 | Endo et al. ................................. | 347/56 |
| 5,729,259 | 3/1998 | Gotoh et al. ............................... | 347/15 |
| 5,825,377 | 10/1998 | Gotoh et al. ............................... | 347/15 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

In an apparatus for performing printing with a higher density ink and a lower density ink of the same color type, in order to prevent degradation of printing quality due to overlapping printing of the higher and the lower density inks, an input image signal is converted to an output image signal indicative of one of "non-printing" "printing with lower density ink" and "printing with higher density ink" is generated. More specifically, when printing is performed with two kinds of inks, i.e. the higher density ink and the lower density ink with respect to the same color type inks, the input image signal is subject of conversion process into three level data and two out of three levels are taken as printing signals of a head for ejecting the higher and lower density inks.

23 Claims, 27 Drawing Sheets

| 80 | 80 | 130 | 190 | 70 |
|----|----|-----|-----|-----|
| 50 | 40 | 230 | 200 | 120 |

FIG. 15A

| ▨ | 80 | 130 | 190 | 70 |
|---|----|-----|-----|-----|
| 50 | 40 | 230 | 200 | 120 |

FIG. 15B

Error
= INPUT VALUE − OUTPUT VALUE
=       80     −     127
=      −47

FIG. 15C

$e1 = \text{Error}/2 = -23$
$e2 = \text{Error}/4 = -11$
$e3 = \text{Error}/4 = -11$

| ▨ | 57 | 130 | 190 | 70 |
|---|----|-----|-----|-----|
| 39 | 29 | 230 | 200 | 120 |

INK-JET PRINTING APPARATUS FOR PRINTING WITH A PLURALITY KINDS OF SAME COLOR TYPE INKS HAVING DIFFERENT DENSITY

BACKGROUND OF THE INVENTION

1. Field of the Invention

The present invention relates generally to an ink-jet printing apparatus. More specifically, the invention relates to an ink-jet printing apparatus for performing printing with inks of different densities for the same color type inks.

2. Description of the Related Art

Associated with spread of copy machines, information processing apparatuses, such as wordprocessors, computers and so forth, telecommunication apparatuses and so forth, as a image formation (printing) apparatus for these apparatus, there has been spreading an apparatuses for performing digital image printing employing an ink-jet type printing head. On the other hand, associated with progress in the information processing apparatus, the telecommunication apparatus and so forth in handling higher quality image and color image, the demand for higher quality and color printing capability for the printing apparatus is progressively growing.

In such printing apparatuses, in view of the improvement of a printing speed and so forth, in which a large number of printing element integrally arrayed (hereinafter occasionally referred to as "multi-head"), a printing head in which a plurality of ink ejection openings and liquid passages are integrated at high density is employed, generally. Furthermore, for providing color printing capability, a plurality of multi-heads respectively for cyan, magenta, yellow and black are provided.

However, integration density of the ink ejection openings and the liquid passages is limited. As a result, due to the presence of a limit in increasing of density of dots to be formed by erection of the ink, a problem is encountered in that granular feeling of dots may be given in highlight portion of a printed image to prevent further enhancement of image quality.

As a solution for this, there has been proposed a multi-drop system, in which, instead of increasing integration density of the ink ejection openings and the liquid passages, dots of the ink to be ejected is made relatively small and such small dots are printed for a plurality of times on a same pixel of a printing medium depending upon printing density. In the multi-drop system, since a dot diameter can be made smaller than that in normal ink-jet printing, a granular feeling in the highlight portion can be improved. However, compromising with stability of ejection, there is a limitation for reduction of the dot size to limit reduction of granular feeling. Also, in such system, in order to obtain relatively high density, the number of ink droplets to be overlappingly ejected is inherently increased to cause lowering of the printing speed. Thus, a trade-off between the enhancing of printing quality and printing speed can be caused.

Furthermore, as another measure for gaining higher printing quality in the highlight portion, a multi-density printing system has been proposed. In the multi-density printing system, by employing higher density ink and lower density ink containing mutually different concentrations of a color agent, e.g. dye for the same color type, and performing printing for the highlight portion with the lower density ink, granular feeling can be weakened to be imperceptible. In conjunction therewith, by employing the higher density ink for a dark portion having higher image density, lowering of printing speed can be restricted.

FIG. 1 shows a major portion of a conventional multi-density type ink-jet printing apparatus.

In FIG. 1, on a carriage 706, eight ink tanks 701 respectively containing higher density inks and lower density inks for each of black, cyan, magenta and yellow, and eight multi-heads 702 for ejecting respective of the higher density inks and lower density inks stored in respective ink tanks, are mounted. FIG. 2 is a diagrammatic illustration of a plurality of ink ejection openings arranged on each of the multi-heads. As shown in FIG. 2, respective heads 702 are arranged on the carriage 706 in the order of higher density black ink Kk, low density black ink Ku, higher density cyan ink Ck, lower density cyan ink Cu, higher density magenta ink Mk, lower density magenta ink Mu, higher density yellow ink Yk and lower density yellow ink Yu. It should be noted that, in FIG. 2, a direction to eject the ink is toward the backside of a drawing sheet of FIG. 2. In each of the heads 702, ejection openings 801 are arranged along Y direction which is a transporting direction of a printing medium. On the other hand, each head 702 can be scanned in the X direction perpendicular to the Y direction. It should be noted that the arranging direction of the ejection openings may be slightly angled in an XY plane, as shown in FIG. 2. In this case, associated with scanning of the head in the X direction, the timings of ink ejection through respective of the ejection openings arranged in each head can be differentiated depending upon scanning speed.

Referring back to FIG. 1, a reference numeral 703 denotes a paper transporting roller to grip a printing paper 707 together with an auxiliary roller 704, and to transport the printing paper 707 in a direction Y in the drawing as being rotatingly driven in a direction of arrow in the drawing, by means of a driving means (not shown). On the other hand, a reference numeral 705 denotes a feeder roller to be driven by a driving means (not shown) for feeding the recording paper. In this transporting arrangement, by providing higher transporting speed of the paper transporting roller 703 than feeding speed by the feeder roller 705, a given tension may be applied on the printing paper 707 to be transported. The carriage 706 is located at a home position h as shown by broken line in FIG. 1 in non-printing state or upon performing an ejection recovery process of the multi-head.

The carriage 706 in the stand-by state at the home position is responsive to a print start command to move in x direction along a carriage guide shaft 708. Then, by performing ejection of ink depending upon a print signal through n number (eight in FIG. 2) ejection openings 801 of the multi-head, printing can be performed at a width corresponding to an arranging width of the ejection openings of the multi head on the printing paper 707. In this scanning, ink droplets can hit on each pixel on the printing paper 707 in the order of the higher density black ink, the lower density black ink, the higher density cyan ink, the lower density cyan ink, the higher density magenta ink, the lower density magenta ink, the higher density yellow ink and the lower density yellow ink. By this, dots respectively having color and density corresponding to the printing data can be formed. When printing is completed up to an end of a printing region in the vicinity of the edge portion of the printing paper, the carriage is returned to the home position. In conjunction therewith, the printing paper 707 is fed in the transporting direction. Subsequently, printing scan in the x direction is performed again. Thus, by repeating printing and paper feeding in the magnitude corresponding to the width arrangement of the ejecting portions per each scan of the carriage, printing can be performed on the printing paper.

FIG. 3 is a block diagram showing an image signal processing circuit in the above-mentioned ink-jet printing apparatus.

An original image signal of R, G, B obtained by reading by means-of an image scanner or through process of a personal computer or so forth, is converted into density signals Y1, M1 and C1 of yellow, magenta and cyan by color conversion.. Then, three signals come to be the object of color correction in a masking circuit 40. Subsequently, an under color removing process is performed by an under color removing and black generating circuit 41 to generate new image signals Y36, M36, C36 and K36 of yellow, magenta, cyan and black. Next, in a γ correction circuit 42; gamma correction is performed using a gamma correction table shown in FIG. 4. After gamma correction, the corrected image density signals Y37, M37, C37 and K37 are divided by a density dividing circuit 43 into image density signals Kk38, Ck38, Mk38 and Yk38 of the higher density black ink, the higher density cyan ink, the higher density magenta ink and the higher density yellow ink having high dye concentration, and into image density signals Ku38, Cu38, Mu38 and Yu38 of the lower density black ink, the lower density cyan ink, the lower density magenta ink and the lower density yellow ink having low dye concentration.

FIG. 5 is an illustration showing one example of density dividing method.

As shown, for example, when level of an input density signal is "128", a density signal for the lower density ink is output at "255" and a density signal for the higher density ink is output at "0". On the other hand, for example, when the level of the input density signal is between "128" and "255", output density signals for the lower density ink and the higher density ink are determined at respective levels determined at a given ratio. It should be noted that while dividing into higher and lower density signals may be performed by sequentially performing a predetermined arithmetic operation on the basis of input image density signal levels to obtain output image density signals, it is typical to employ a density dividing table based on FIG. 5 for speeding of the process. The density dividing table is set depending upon a ratio of dye concentrations of inks so that the level of an image density signal value and an optical density of printed image are proportional to each other.

Referring back to FIG. 3, after dividing the density, a respective conversion process into binary signals is performed by a conversion circuit 44 to generate image signals Kk39, Ku39, Ck39, Cu39, Mk39, Mu39, Yk39 and Yu39 which are transfered to eight multi-heads 702.

As a method for conversion into binary data employed in the conversion circuit 44, the Dither method can be employed, for example. Dither method is a method to perform converting into binary data with a predetermined Dither pattern in which a threshold values with respect to density signals of respective pixels are differentiated.

As for other methods for conversion into binary data, there are an error diffusion method and an average density preserving method. The former error diffusion method is a method in which the density signal of the pixel being processed is converted into the binary signal, a given weight is attached to an error which is produced as a difference between a level of a converted density signal and a level of the density signal before the conversion, and the weighted error is added to density signals of adjacent pixels to the pixel being processed, as disclosed in R. Floyd & L. Steinberg, "An Adaptive Algorithm for Spetial Gray Scale", SID 75 Digest, PP 36 to 37.

On the other hand, the latter average density preserving method is a method in which an average value of binary data of respective pixels at which the conversion into the binary value has been performed and which are in a vicinity of a pixel being processed, or of binary data of the respective pixels and the pixel being processed, is derived. The conversion of an image data of the pixel being processed into the binary data is performed by using a threshold value based on the average value The printed image with construction shown in FIGS. 1 to 5 can be printed with the lower density ink in the highlight portion. Therefore, the granular feeling of the dots of the ink can be reduced. Also, the dark portion of high density is printed with the lower density ink and the higher density ink, therefore, lowering of density of the printed image can be restricted in comparison with the multi-drop system.

However, there are several problems to be considered in the density dividing system. These problems are caused in conjunction with printing with higher and lower density inks of the same color type.

For example, when density dividing is performed as shown in FIG. 5, in a region where the input image density signal level is higher than 128, the total of the level of each of the higher and lower density output density signals always becomes 255. As a result of this, at least one of the higher density ink and the lower density ink is frequently ejected even after the conversion into the binary data is performed so that an ejected ink density in the printing midum becomes substantially equal to that in printing of 100% duty. More specifically, in comparison with the printing method in which printing of the dark portion is performed by employing the higher density ink only, ink consuming amount in an intermediate tone image becomes large in the multi-density printing system. In addition, it becomes necessary to consider problems such as expansion and shrinking of the printing paper (cockling) and delay of fixing of ink to the printing paper which may be ordinarily caused when the ejected ink density in the printing paper is high. That is, the above-stated problems are caused not only in the high density image region in printing with only higher density ink, but in the half tone region in case of the multi-density printing.

However, the problem of ink consuming amount set forth above should not be a significant problem in consideration of cost-performance, in comparison with the cost performance in enhancement of the image quality. Also, the problem caused regarding the ejected ink density in the printing paper is solved by having a structure so that stable printing of the high duty image can be performed, and cannot be significant problem in comparison with the ink-jet printing system in which the dark portion is printed only with the higher density ink.

In the multi-density system printing, the following significant problems can be encountered. In the multi-density printing system, it is possible that the image density as originally required cannot be obtained, or, image quality is degraded due to occurrence of specific density fluctuation.

For example, in an ink-jet printing system, when a following ink droplet is ejected on a preceding ink droplet in an overlapping manner, in the overlapping portion, the later hit ink tends to penetrate in greater depth in the paper than the earlier hit ink. As a result of this, when the ink of higher density is ejected earlier, for example, optical density of a region of an image where the ratio of the higher density ink and the lower density ink hit on the same pixel is large, becomes lower than the density of a region of the image where the ratio of the higher density ink and the lower density ink hit on the same pixel is small, even if the output image signals of higher and lower density inks are the same, respectively. More specifically, the later hit lower density ink penetrates in the printing paper so as not to obtain increasing of optical density corresponding to an amount of the lower density ink bit on the printing paper. As a result of this, in such region where an overlapping proportion is large, the optical density becomes low. When such phenomenon is caused randomly at respective portions of a printed image, local low density regions may be caused in the image which is originally required have uniform density. Also, owing to continuous formation of such local low density regions, specific density fluctuation may appear in the printed image to cause degradation of the printed image.

Furthermore, in the case of printing an image in which density varies in stepwise fashion, it is not possible to satisfactorily realize continuity of the tone in the printed image when the phenomenon stated above is caused.

FIG. 6 shows such failing to be a continuity of the tone of the printed image. For simplification of disclosure, the following discussion will be given in terms of an example where printing is performed with higher and lower density black inks. FIG. 6 shows a manner of printing with respective of a higher density head and a lower density head on a basis of binary printing signals which are obtained by converting each of signals processed through density dividing for an input image density signal employing the density dividing table into binary signals by using the Dither method, in the case where the level of the input image density signal is 159. More specifically, as shown in FIG. 6, on a basis of the density dividing table shown in FIG. 5, the image density signals of level 191 is assigned for the lower density head and level 64 is assigned for the higher density head. Then, by converting respective image density signals into binary signals with a simple Dither pattern, data of pixel arrangement for printing with respective of the higher density ink and the lower density ink can be obtained. Further, in the printing operation, since scanning of the higher density head is performed in advance of scanning pf the lower density head, the higher density ink hits the paper surface at earlier timing to form a dot, and subsequently, the lower density ink hits the paper surface to form a dot. At this time, in the pixels, on which both of the higher density ink and the lower density ink are printed in overlapping manner (dot of solid black in FIG. 6), the image is fixed in the condition where the lower density ink penetrates below the higher density ink to cause only a slight increase of density from the density obtained by printing with only higher density ink and not to cause increasing of optical density as can be obtained when the lower density ink is printed independently. As a result, the only density slightly lower than that should be originally obtained, can be obtained to cause degradation of reproductivity of tone in the printed image.

When another known method for conversion into binary data such as the error diffusion method or the like is employed, arrangement of the pixels with respective inks becomes irregular, as shown in FIG. 7, to cause a local density difference between a portion where higher and lower density inks do not overlap and a portion where the higher and lower density inks overlap, A continuous arrangement of such local density differences may cause specific fluctuation of density (texture).

As set forth above, even in multi-density printing system which may realize high image quality relatively easily as set forth above, a problem of overlapping of the higher and lower density inks should be encountered. Therefore, it has been desired to solve such problem for gaining further higher image quality.

SUMMARY OF THE INVENTION

Therefore, it is an object of the present invention to provide an ink jet printing apparatus and an ink-jet printing method which can avoid degradation of a printed image quality due to overlapping of higher density ink and lower density ink by avoiding hitting of the same color type inks with different density on the same pixel.

Another object of the present invention is to provide an ink-jet printing apparatus and an ink-jet printing method which can avoid overlapping printing of different density of inks in printing with n−1 kinds of the same color type inks of different density by making each of n−1 kinds of the same color type inks to correspond to each of values of n level which are obtained by converting an image data into n levels data, without causing overlapping.

In a first aspect of the present invention, there is provided an ink-jet printing apparatus performing printing on a printing medium by using a printing head having a plurality of ejection portions respectively ejecting a plurality of kinds of the same color type inks with mutually different densities, comprising:

data processing means for processing printing data for each pixel to generate ejection data for each pixel, the ejection data being that the same color type inks of different densities are not ejected in an overlapping manner; and head driving means for driving the printing head for performing the ejection on a basis of the ejection data generated by the data processing means.

In a second aspect of the present invention, there is provided an ink-jet printing method performing printing on a printing medium by using a printing head having a plurality of ejection portions respectively ejecting a plurality of kinds of the same color type inks with mutually different densities, comprising the steps of:

processing printing data for each pixel to generate ejection data for each pixel, the ejection data being that the same color type inks of different densities are not ejected in an overlapping manner; and driving the printing head for performing ejection on a basis of the ejection data generated in the step for processing printing data.

In a third aspect of the present invention, there is provided a printing product printed by using a plurality of kinds of the same color type inks with mutually different densities, wherein each pixel of the printing product is not formed with the same color types of inks having different densities in overlapping manner.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIGS. 15A to 15E are explanatory illustrations concretely explaining the conversion process;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 8:
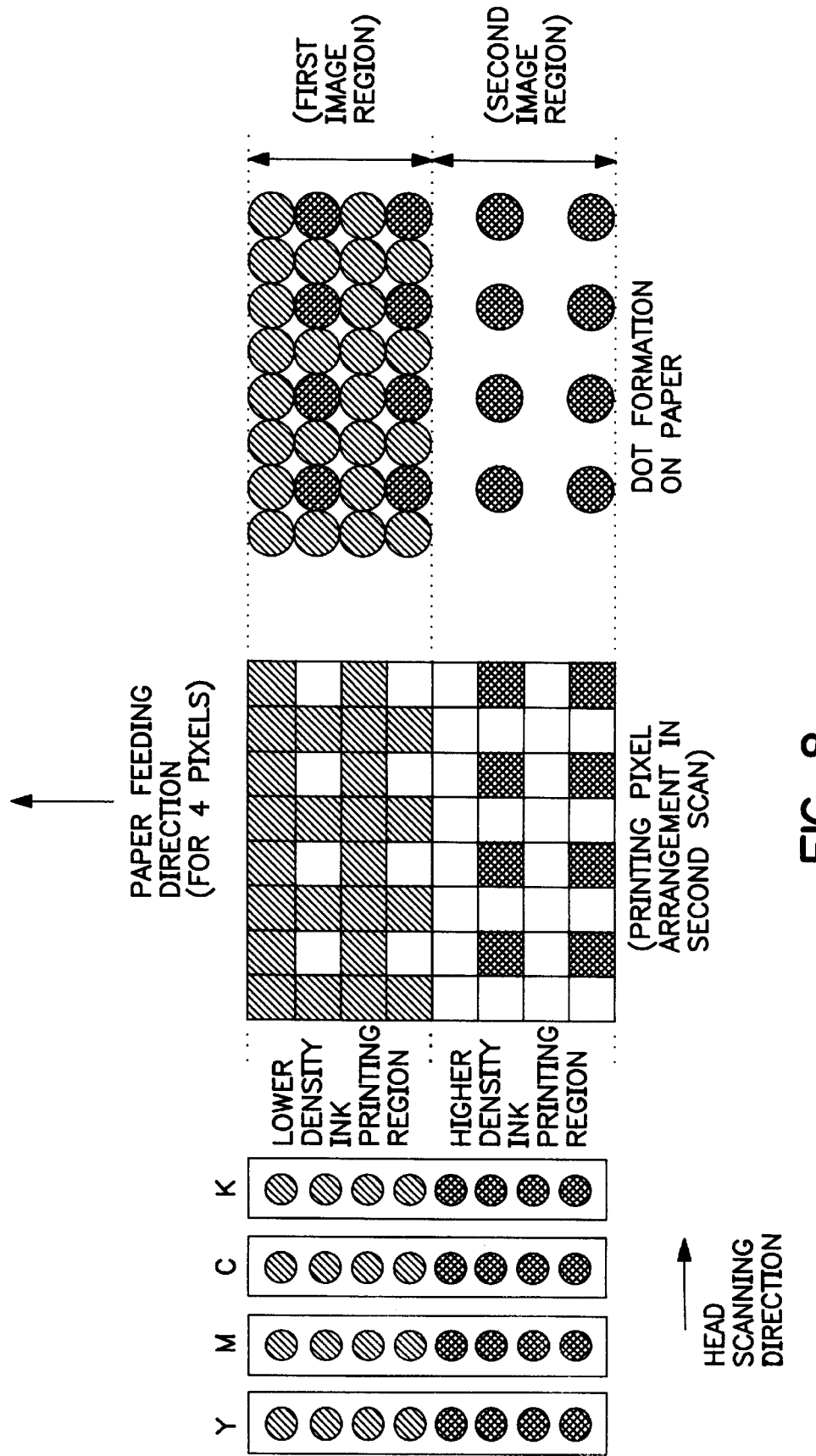
FIG. 8 is an explanatory illustration for explaining printing in one embodiment of the present invention.

FIG. 8 is an explanatory illustration for explaining a printing head arrangement and printing operation in one embodiment of the present invention.

The shown embodiment of a printing head is an integrated head construction for the same color type inks for improving precision of hitting position of higher and lower density inks. More specifically, the higher density ink and the lower density ink of the same color type are ejected through respectively corresponding ejection openings provided on the integrated head. In this construction, the printing heads for respective color inks are arranged in an order of black, cyan, magenta and yellow. A printing paper is adapted to be fed per half width of the ejection opening arranging width of respective heads, namely, per the arranging width of ejection openings of each of the higher and lower density inks By this, in the first scan, printing with higher density ink is performed for a first imaging region. Thereafter, the printing paper is fed for a half width of the arranging width of the ejection openings. Then, in the second scan, printing with the lower density ink is performed for the first imaging region, and, in conjunction therewith, printing with the higher density ink is performed for the second imaging region. Subsequent printing operations is performed in similar manner.

Figure 9:
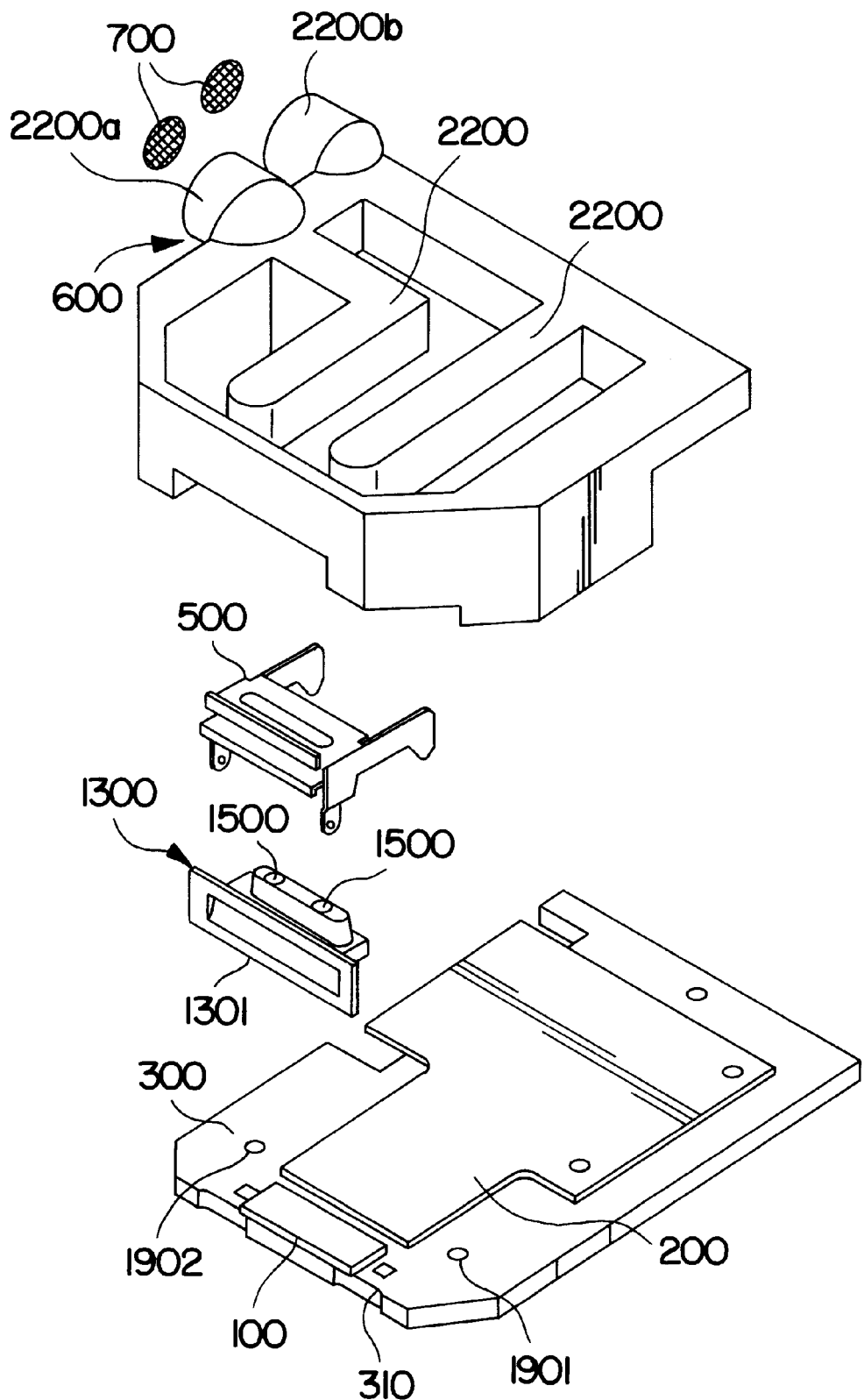
FIG. 9 is an exploded perspective view showing a construction of a head unit to be employed in one embodiment of the present invention.

FIG. 9 is an exploded perspective view showing a construction of the printing head to be employed in the shown embodiment.

A predetermined wiring at one end of a wiring substrate 200 is connected to a predetermined wiring of a heater board 100, on which electro-thermal transforming elements are arranged, by wire bonding (wire bonding is not shown). On the other hand, on the other end of the wiring substrate 200, a plurality of pads (not shown) are provided for receiving electric signal from a main body of an apparatus. By this arrangement, the electric signal from the main body of the apparatus is supplied to a driver circuit on the heater board for driving electro-thermal transforming elements provided corresponding to respective ejection openings. A metallic support body 300 supporting a back surface of the wiring substrate 200 on a plain, forms a base member of the printing head. In order to resiliently depress a line form region in the vicinity of ink ejection openings of a grooved upper plate 1300, a depression spring 500 has a plane form depression portion, a bending portion of essentially U-shaped cross section, a claw for engaging with a hole provided in the supporting body 300, and a pair of rear legs bearing a force acting on the depression spring on the supporting body 300. Then, the grooved upper plate 1300 is depressed toward the wiring substrate 200 with the depression force. Mounting of the wiring substrate 200 to the supporting body 300 is performed by bonding with an adhesive.

Filters 700 are provided at ends of tubes 2200a and 2200b forming ends of an ink supply tube 2200 of an ink supply member 600. The ink supply member 600 is manufactured by molding. On the other hand, the grooved upper plate 1300 is similarly formed integrally with an orifice plate 1301 and flow passages 1500 for guiding ink into respective ink supply openings. The ink supply member 600 is fixed on the support body 300 by passing two pins (not shown) on the back surface side of the ink supply member 600 through respective holes 1901 and 1902 of the support body 300 and by thermally welding those pins. At this time, a gap between the orifice plate 1301 and the ink supply member 600 is sealed by a predetermined sealant, through the groove 310 provided in the support body 300, a gap between the orifice plate portion 1301 and the front end portion of the support body 300 is similarly sealed.

Figure 10:
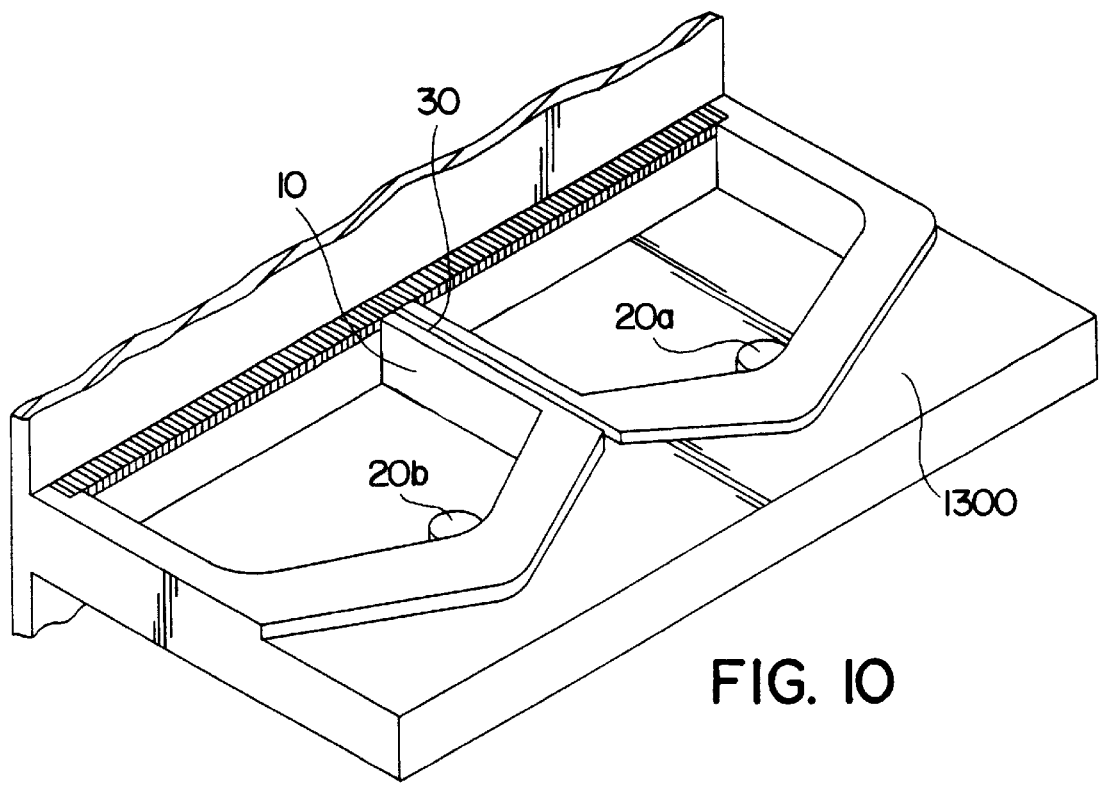
FIG. 10 is a perspective view of a grooved upper plate forming the head unit as viewed from the side of a surface mating with a heater board.

FIG. 10 is a perspective view of the grooved upper plate 1300 of the printing head shown in FIG. 9, as viewed from the heater board 100 side. Two common liquid chambers are provided corresponding to respective of the higher and lower density inks, and respective common liquid chambers are separated by a wall 10. The wall 10 has an end face to be fitted with the heater board 100 under pressure, on which end face, a groove 30 is formed. The groove 30 is communicated with the outer peripheral portion of the grooved upper plate 1300. By this, upon fitting of the grooved upper plate 1300 onto the heater board under pressure, an outer periphery of the grooved upper plate is sealed by the sealant set forth above. At this time, the sealant penetrates along the groove to fill the gap between the grooved upper plate and the heater board. By the technical process employed for the conventional head, the common liquid chambers for respective of the higher and lower density inks can be separated completely. The structure of the groove is differentiated depending upon physical property of the sealant and has to have a shape adapted thereto. By separating the liquid chamber into a plurality of chambers, it becomes possible to eject different inks through respective ink ejection openings. In the shown embodiment, the higher density ink and the lower density ink can be ejected through the same head. As set forth above, by integrating the head, precision in hitting position of the ink droplet between the higher and lower density inks, which is particularly important in multi-density printing, can be improved. It should be noted that, of course, the present invention is applicable for the construction, in which the higher density ink and the lower density ink are ejected through respective different heads.

Figure 11:
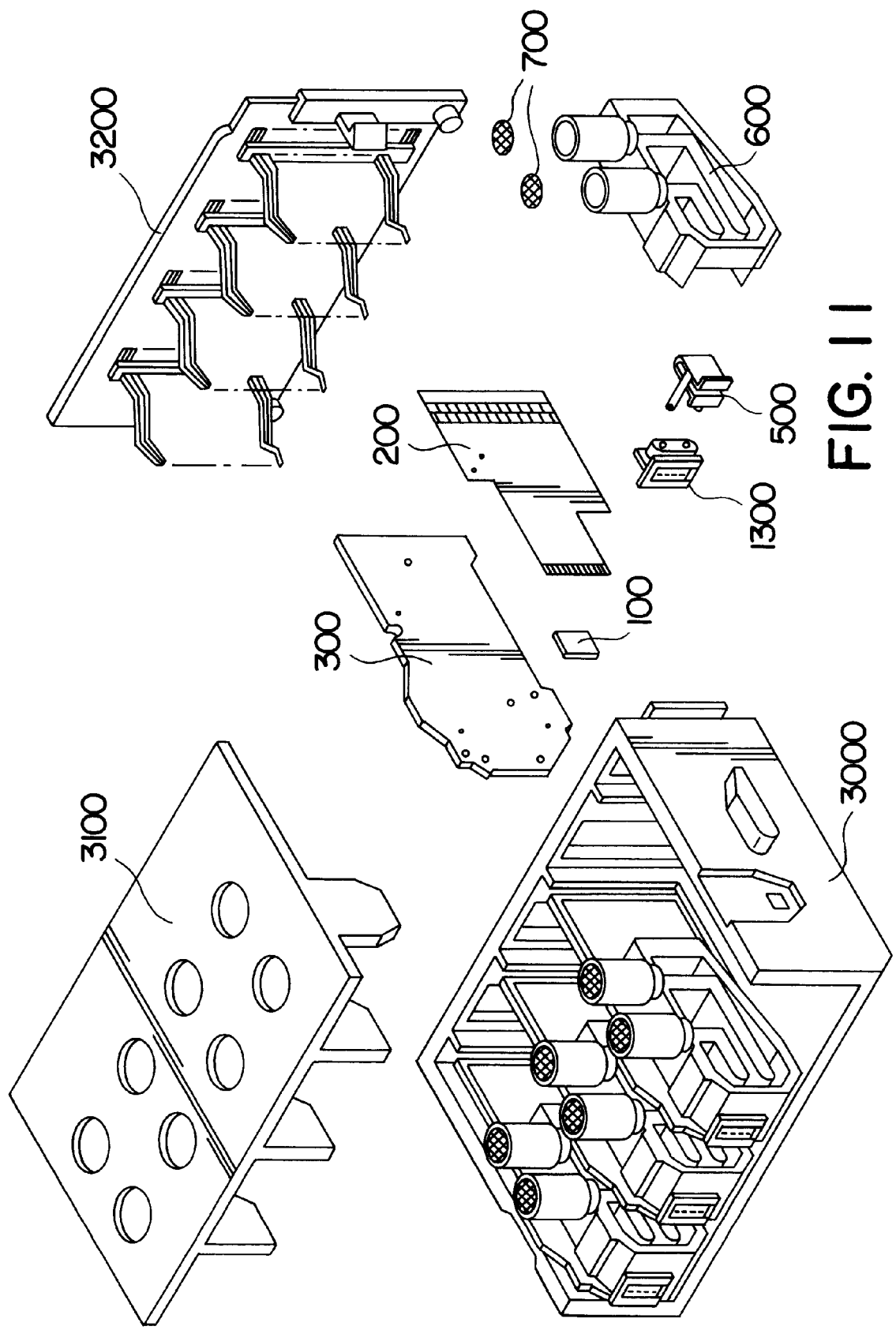
FIG. 11 is an exploded perspective view showing a construction of a four color integrated type head cartridge to be employed in one embodiment of the present invention.

FIG. 11 is an exploded perspective view showing a construction of a printing head unit to be employed in the shown embodiment.

In the shown embodiment, the printing heads as illustrated in FIGS. 9 and 10 are employed for respective higher and lower density inks of colors K, C, M and Y. These four printing heads are integrated by being received within a frame 3000 to form a four head integrated ink-jet cartridge. More specifically, the four printing heads are loaded in the frame 3000 with a given interval, and fixed in a condition where positioning in the arranging direction and ejection opening arraying direction is completed.

It should be noted that while the shown embodiment secures the precision of relative hitting position between the printing heads of respective colors by adjusting position with reference to a mechanical reference surface of the head as set forth above, it is possible to obtain higher precision by temporarily fixing the printing head on the frame, actually performing ejection for measuring the hitting position and directly adjusting the relative hitting positions between respective colors on a basis of the measured data.

In FIG. 11, a reference numeral 3100 denotes a cover of the frame, and a reference numeral 3200 denotes a connector for establishing an electrical connection between pads provided in the respective wiring substrates 200 of the four printing heads and the main body of the printing apparatus. As described above, integrally assembling of the four heads achieves an advantage in improvement of precision of the relative hitting position between the heads as set forth above, in addition to an advantage in convenience of handling. Furthermore, the integral arrangement can achieve an advantage in decreasing the number of signal lines to be connected. For example, signal lines common to four printing heads, such as GND lines and so forth, can be used commonly so that number of required conductors can be reduced. It is also possible to provide an integrated circuit substrate for driving respective printing head in time division to further use the printing signal line in common. Such reduction of electrical connections is particularly effective in the apparatus having a large number of signal lines, such as a color printing apparatus or a high speed ink-jet printing apparatus having a large number of ink ejection openings. Further, the present invention provides a construction effective for the printing apparatus using the higher and the lower density inks.

Figure 12:
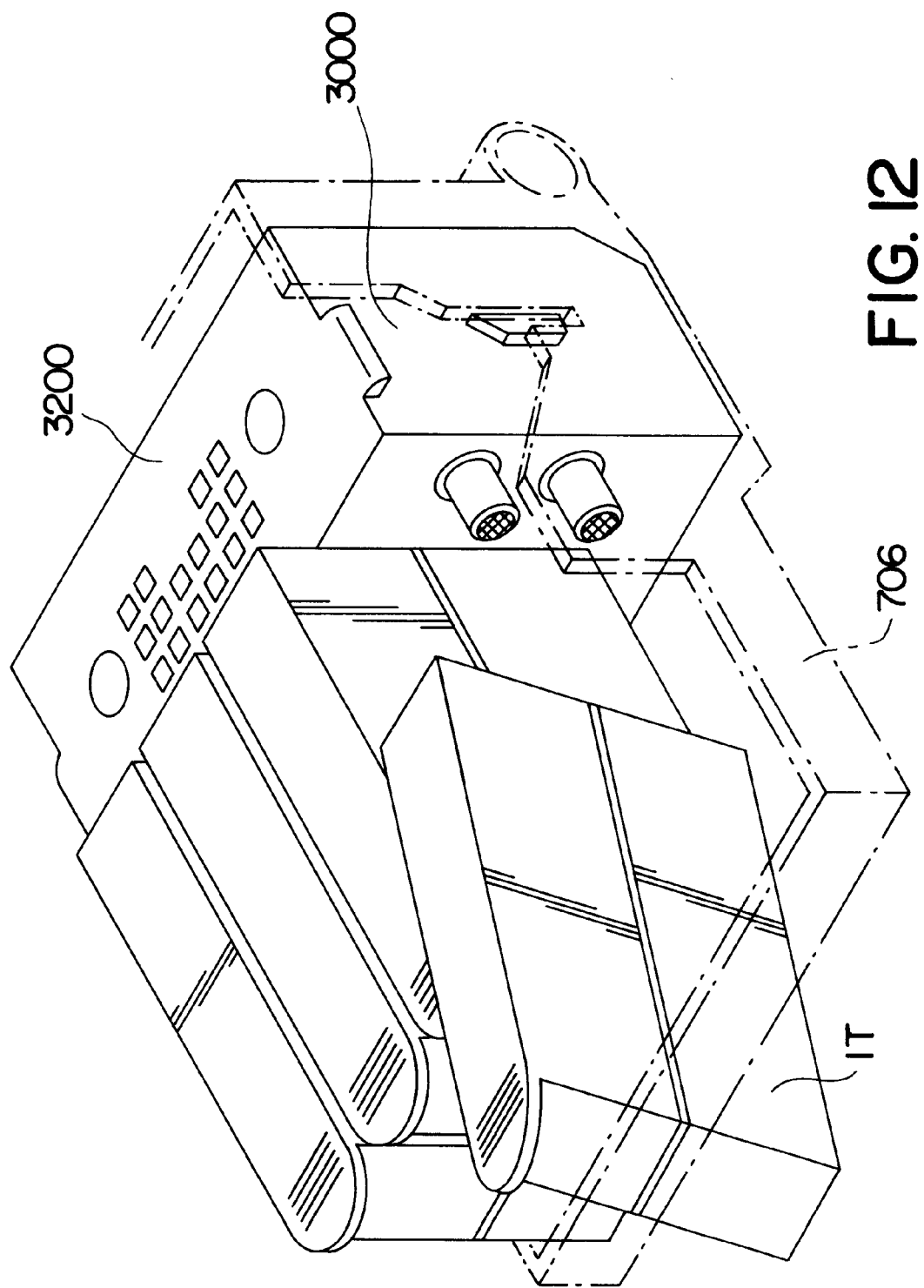
FIG. 12 is an explanatory illustration for the case where the head cartridge and ink tanks are mounted on a carriage.

FIG. 12 is an illustration showing the above-mentioned four head integrated ink-jet head cartridge and manner of mounting of four ink tanks supplying the inks to respective heads on the carriage.

Each ink tank has separated two chambers respectively filled with the higher density ink and the lower density ink. The ink tanks of four colors are coupled with the corresponding printing heads on the carriage. Then, the higher density ink and the lower density ink in respective of separated chambers in the ink tank are supplied to two separated common liquid chambers via the ink supply tubes 2200 or so forth. As set forth above, since the shown embodiment performs printing with the integrated printing head, in which the four color ink tanks respectively filled with the higher and lower density inks, with eight integrated liquid chambers in total and an ejection opening array respectively corresponding thereto, inconvenience which should otherwise encountered in multi-density printing, can be successfully avoided.

Figure 1:
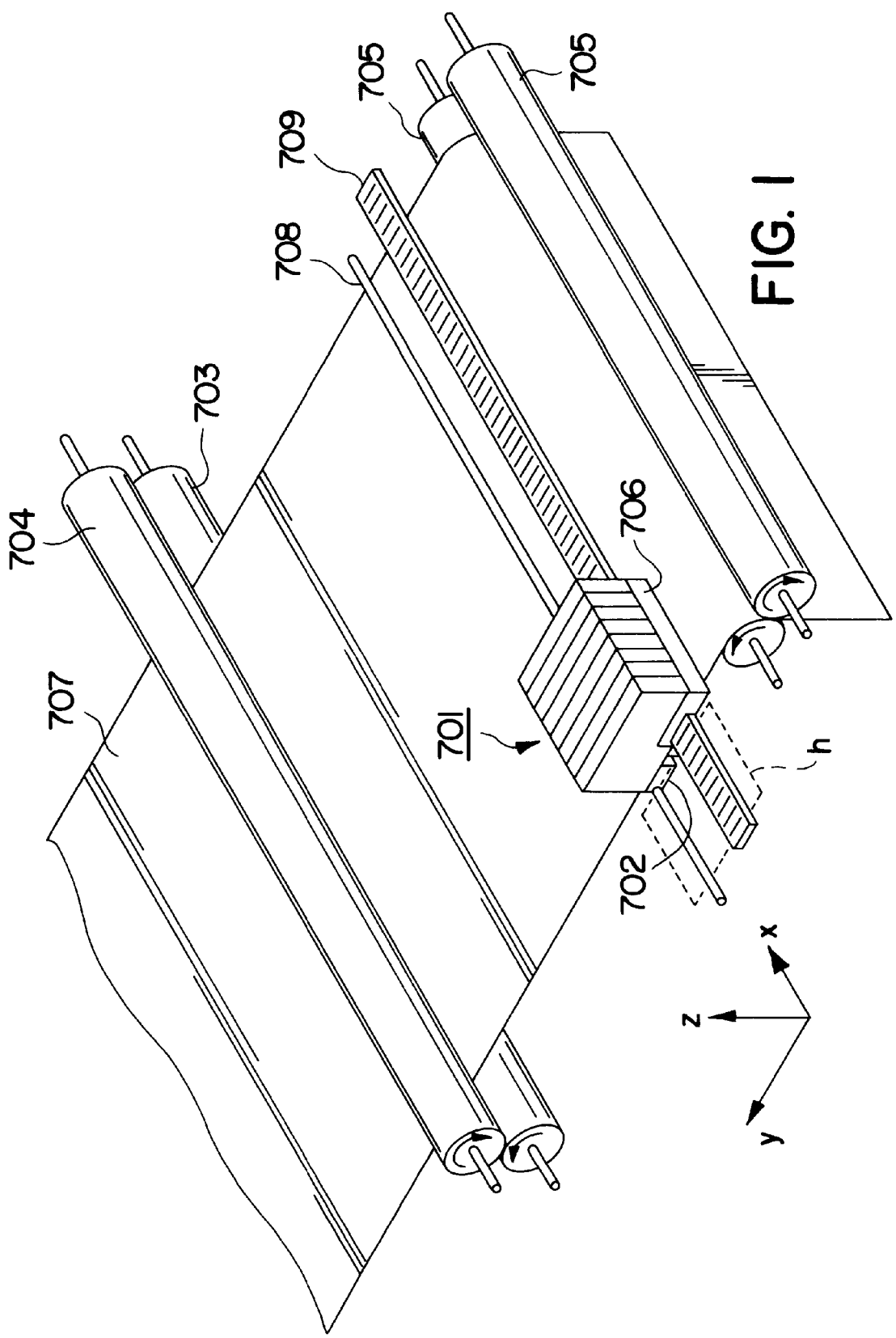
FIG. 1 is a perspective view showing a general construction of a major part of the conventional serial printing type color ink-jet printing apparatus employing higher and lower density inks.
Figure 2:
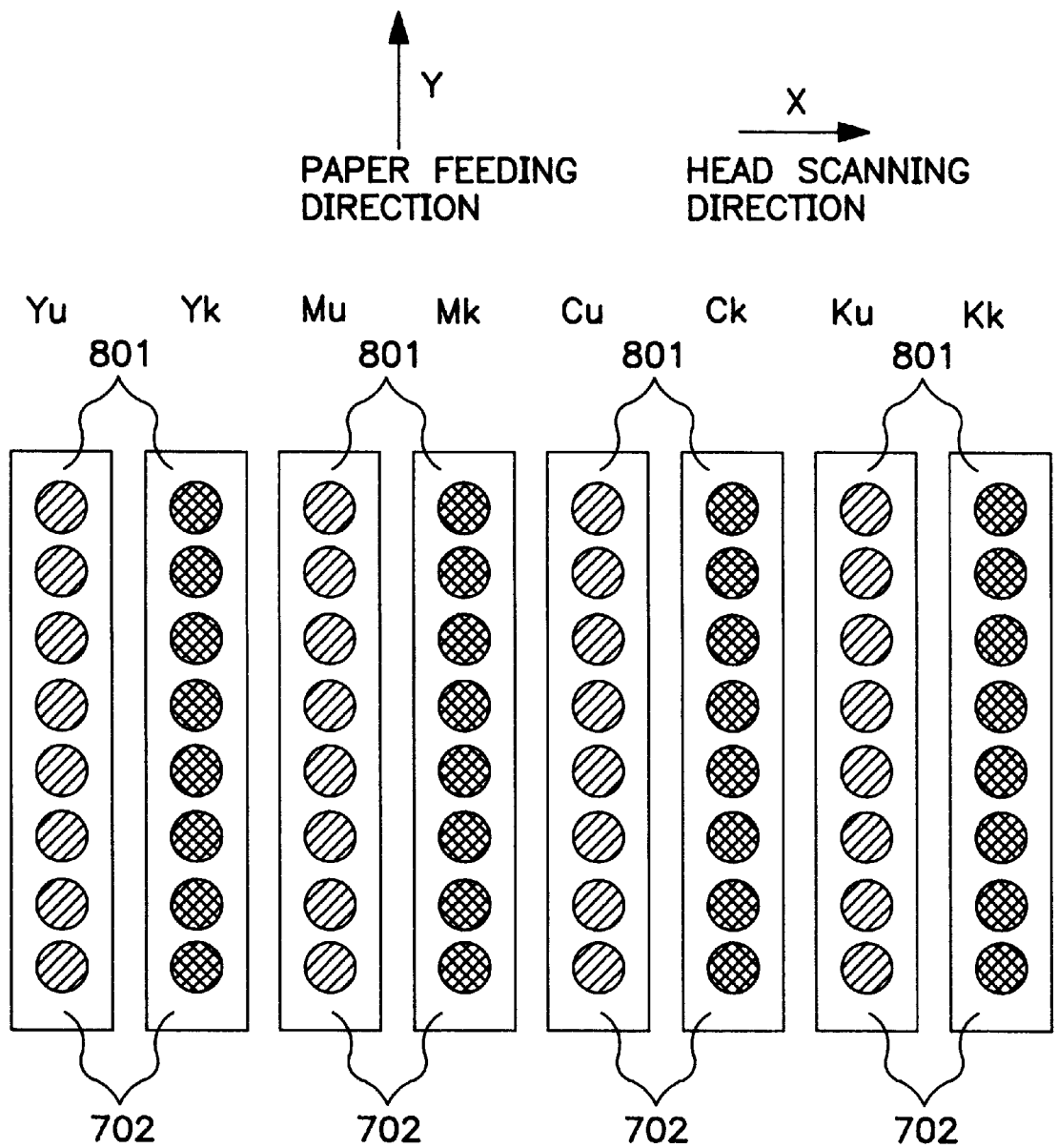
FIG. 2 is an illustration diagrammatically showing ejection openings as viewing a printing head in the apparatus of FIG. 1 from the above.
Figure 13:
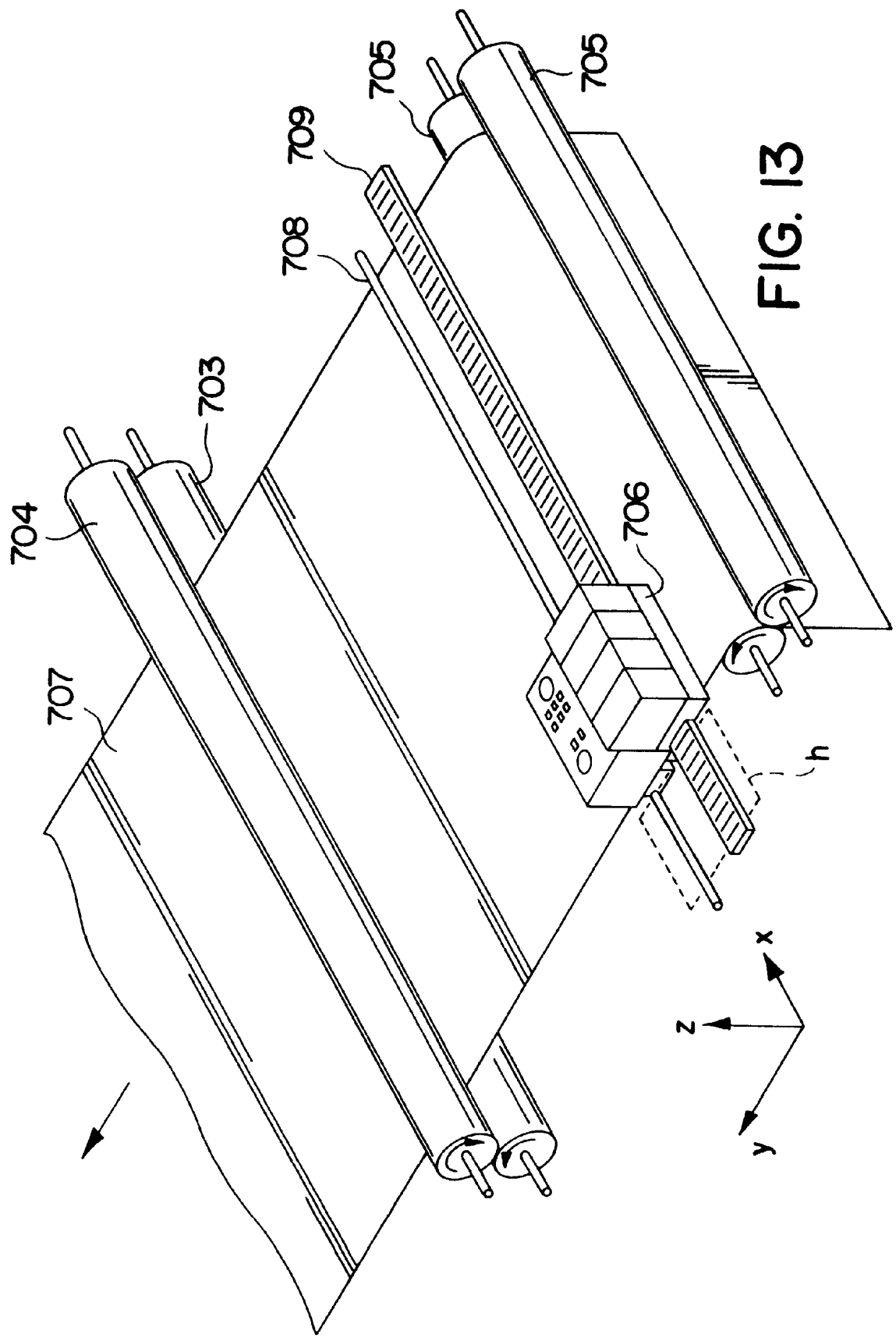
FIG. 13 is a perspective view showing general construction of a major part of one embodiment of an ink-jet printing apparatus according to the present invention.

One example of an ink-jet printing apparatus to which the shown embodiment is applicable is illustrated in FIG. 13. FIG. 13 shows a construction of the major part of the printing apparatus. The apparatus illustrated in FIG. 13 is similar to that in FIG. 1. The construction in FIG. 13 is differentiated from that in FIG. 1 in that an ink-jet head cartridge, integrating the four ink tanks respectively filled with the higher and lower density inks of black, cyan, magenta and yellow, and four printing heads respective adapted to eject the higher and the lower density inks through respective of upper and lower ejection opening arrays, is loaded. It should be noted that, in FIG. 13, electrical terminals in the main body of the printing apparatus for establishing electrical communication with the ink-jet head cartridge are neglected from illustration for simplicity of illustration.

First Embodiment

Figure 14:
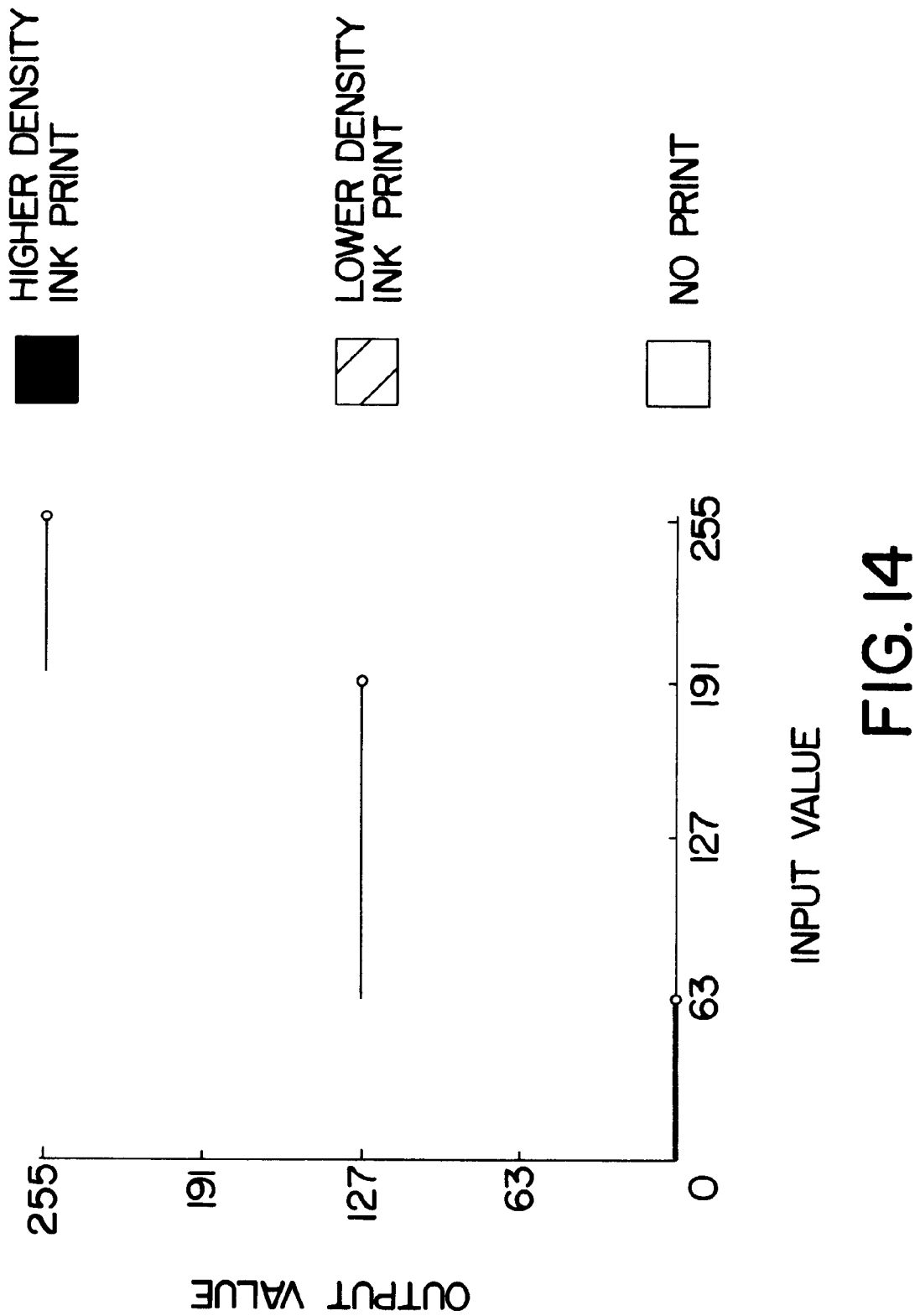
FIG. 14 is a chart showing a relationship between an input image density signal and an output image density signal in one embodiment of the conversion process into three level data according to the present invention.

FIG. 14 is a chart showing a relationship between an input value and an output value in a first embodiment of a conversion process into three level data according to the present invention, and FIGS. 15A to 15E are illustrations for explaining one example of the conversion process into three level data.

In each of FIGS. 15A to 15D, a pixel surrounded by thick line is a pixel being processed, namely a pixel with respect to which the conversion process into three level data is performed for a density value indicated by the corresponding image data to the pixel. The pixel being processed is sequentially shifted to perform the conversion process into three level data for the input density signals of all of the pixels. The input density value "80" of the pixel being processed as surrounded by the thick line in FIG. 15A is output as the density value 127 through the conversion process into three level data shown in FIG. 14. As a result, as shown in FIG. 15B, a corresponding pixel is printed by the lower density ink.

In the relationship of the input value and the output value shown in FIG. 14, the range of the input values x relative to the respective output values are determined according to the following formulae as can be clear from FIG. 14.

0: $0 \leq x < (0+126)/2$

127: $(0+126)/2 \leq x < (127+255)/2$

255: $(127+255)/2 \leq x < 255$

When the conversion process into three level data is completed with respect to the pixel being processed, an error caused by this process, namely a difference between the input density value and the output density value is derived as an Error through a following equation:

Error=input value−output value

The Error in the conversion process into three level data for the pixel being processed in FIG. 15A is, as shown in FIG. 15B, Error=80−127=−47

Thus, the density obtained as a result of printing for the pixel being processed has the error with respect to the input value. However, by distributing the error to pixels located around the objective pixel being processed, the density peripheral of the pixel being processed can be preserved.

More specifically, as shown in FIG. 15C and a following equation, the Error in the pixel being processed is distributed to adjacent three pixels in predetermined distribution ratios 1/2, 1/4 and 1/4.

e1=Error/2 e2=Error/4 e3=Error/4

It should be noted that, in the foregoing example, the error is distributed to adjacent three pixels at the predetermined distribution ratio. Alternatively, the distribution ratio of the three-valued process per pixel may be varied randomly. On the other hand, in the case that the distribution ratio is fixed similarly to the foregoing example, and, in the alternative, pixels to which the error is distributed may be switched randomly. With such random variation of the distribution rate and the pixels to which the error is distributed, occurrence of periodicity on the three-valued image of three level data can be suppressed.

As set forth above, as the conversion process into three level data for the pixel being processed is completed, the pixel being processed is shifted according to the predetermined rule (the pixel is shifted to right side of the pixel in the shown example), as shown in FIG. 15D. Then, for a new objective pixel being processed, the conversion process into three level data is performed with respect to the value containing the distributed error caused in the preceding conversion process. Thus, the conversion process into three level data is progressed sequentially. As a result, an image of three levels as shown in FIG. 15E is obtained.

Figure 16:
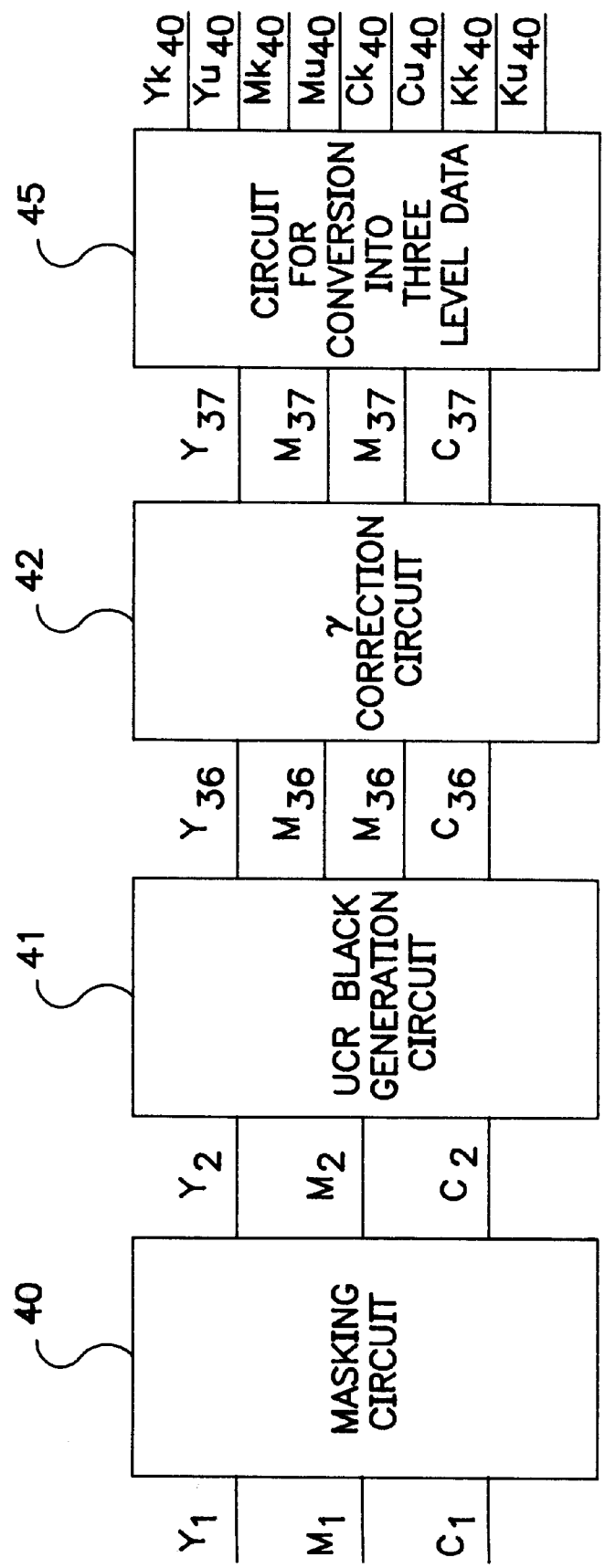
FIG. 16 is a block diagram showing a construction of one embodiment of image signal processing according to the invention.

FIG. 16 is a block diagram showing the shown embodiment of an image signal processing circuit including a circuit to perform the conversion process into three level data as set forth above.

Figure 3:
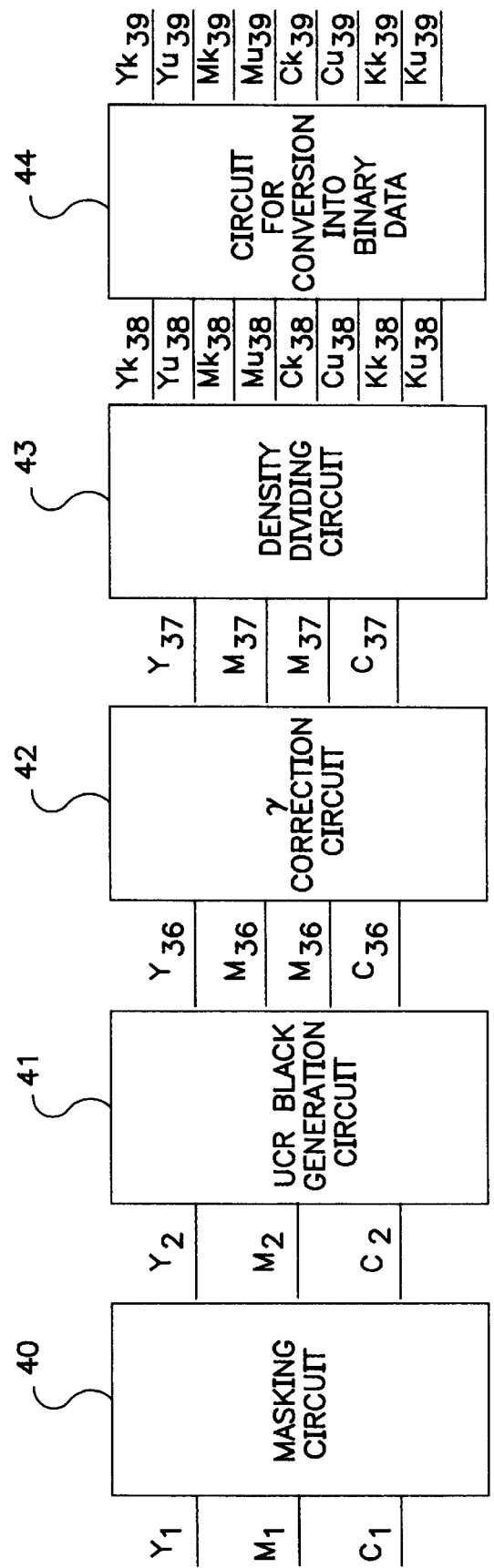
FIG. 3 is a block diagram showing a construction of an image signal processing in the apparatus of FIG. 1.
Figure 4:
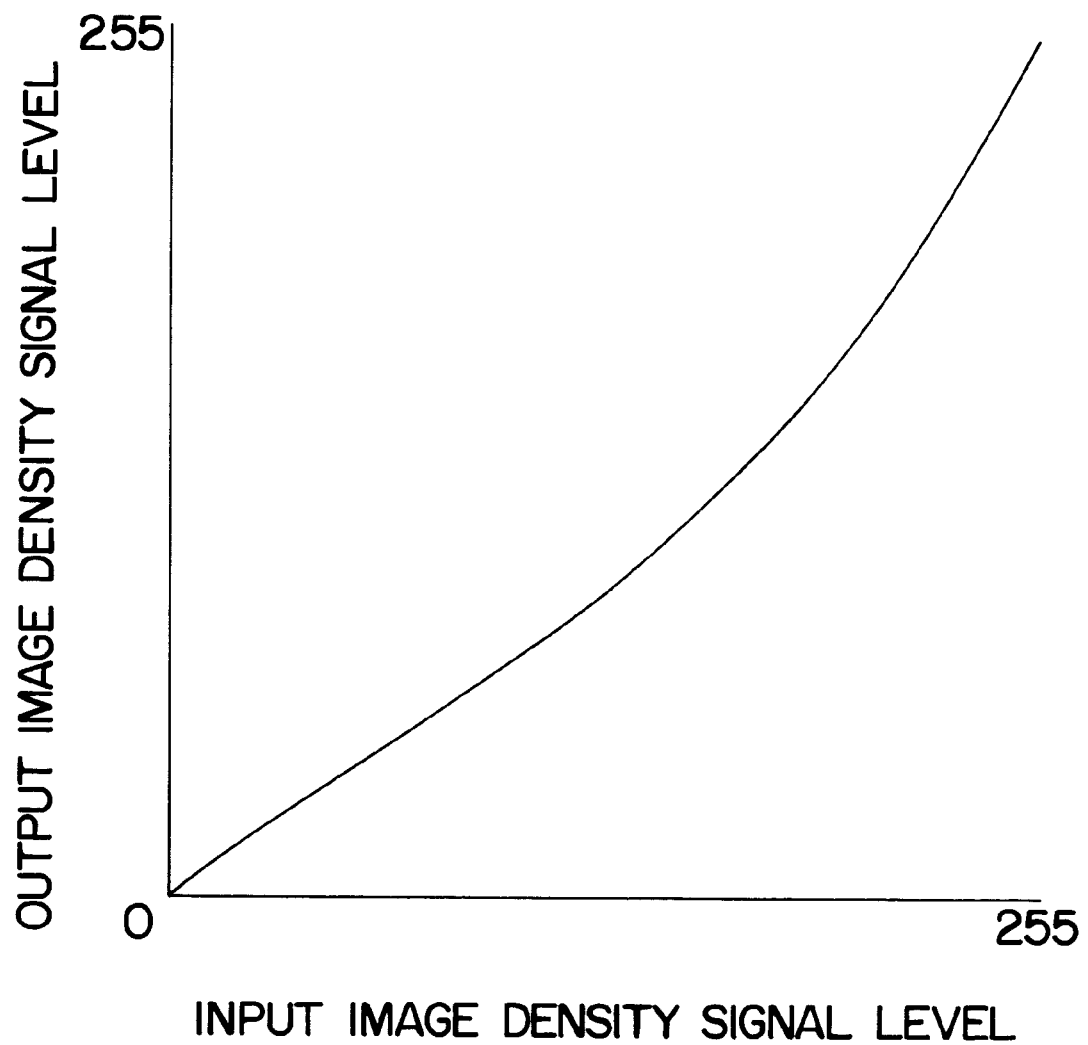
FIG. 4 is an illustration for explaining content of a γ correction table of a γ correction circuit.
Figure 5:
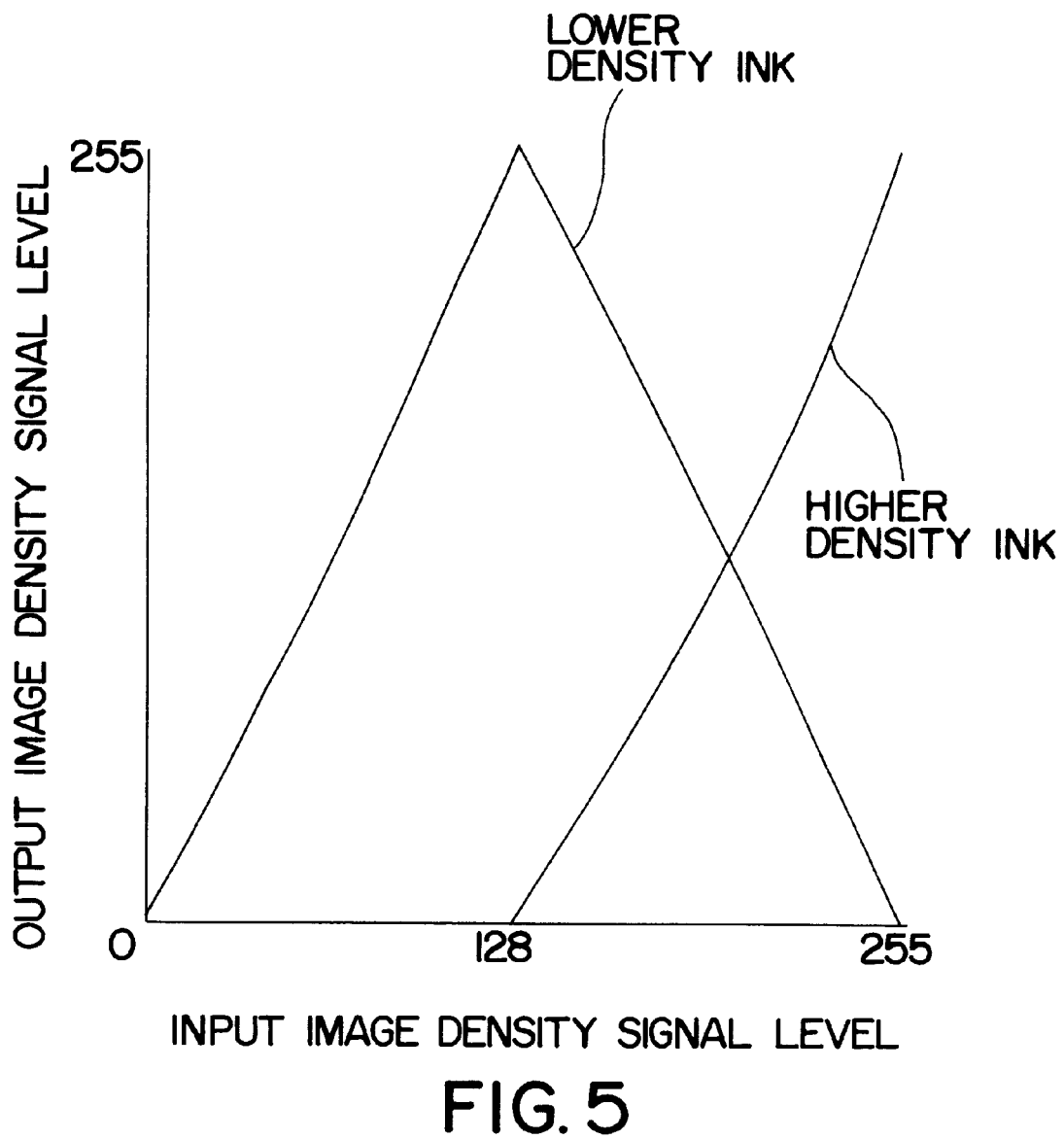
FIG. 5 is an illustration for explaining the content of a density dividing table.
Figure 6:
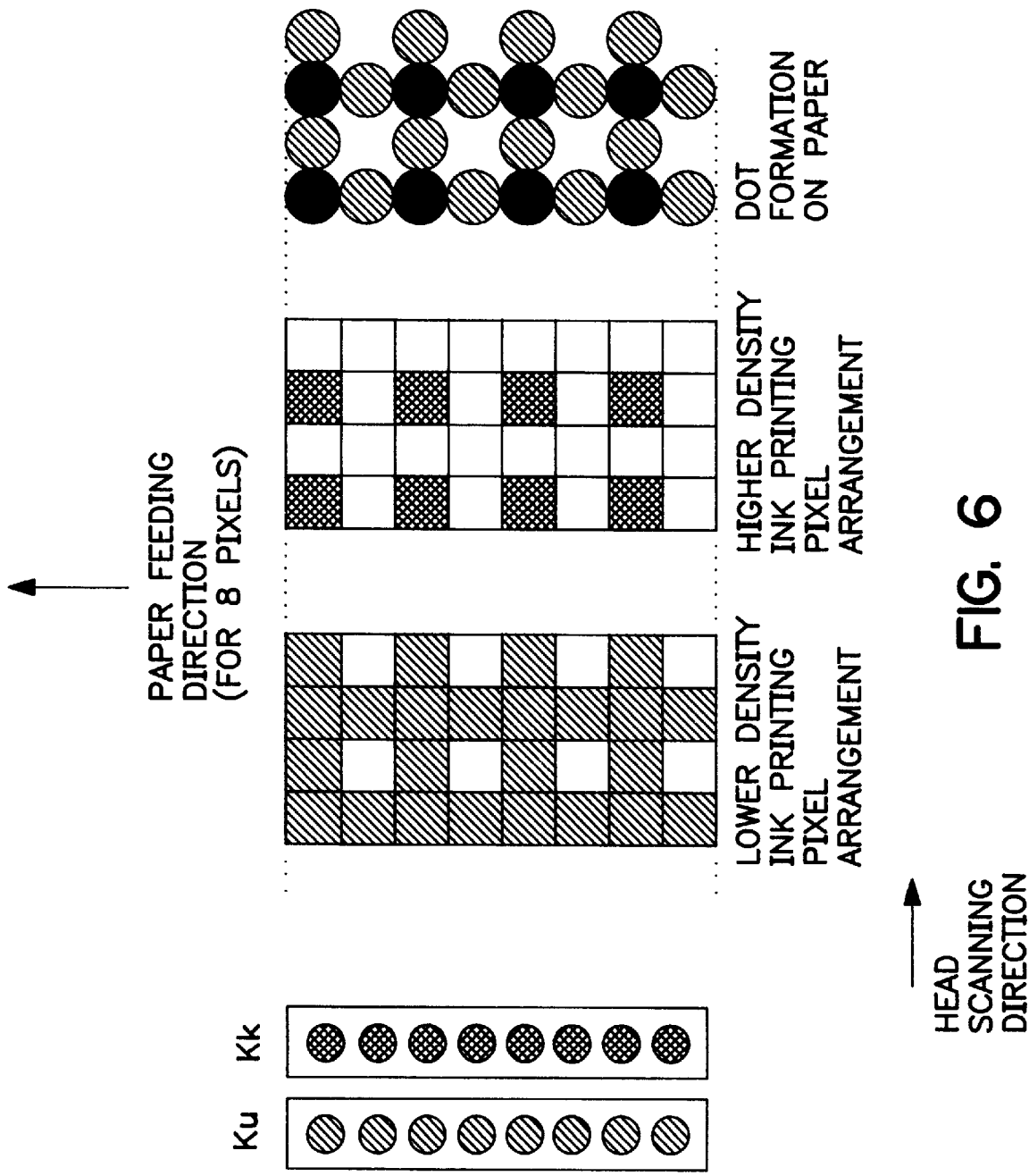
FIG. 6 is an explanatory illustration for explaining printing employing the conventional density dividing.
Figure 7:
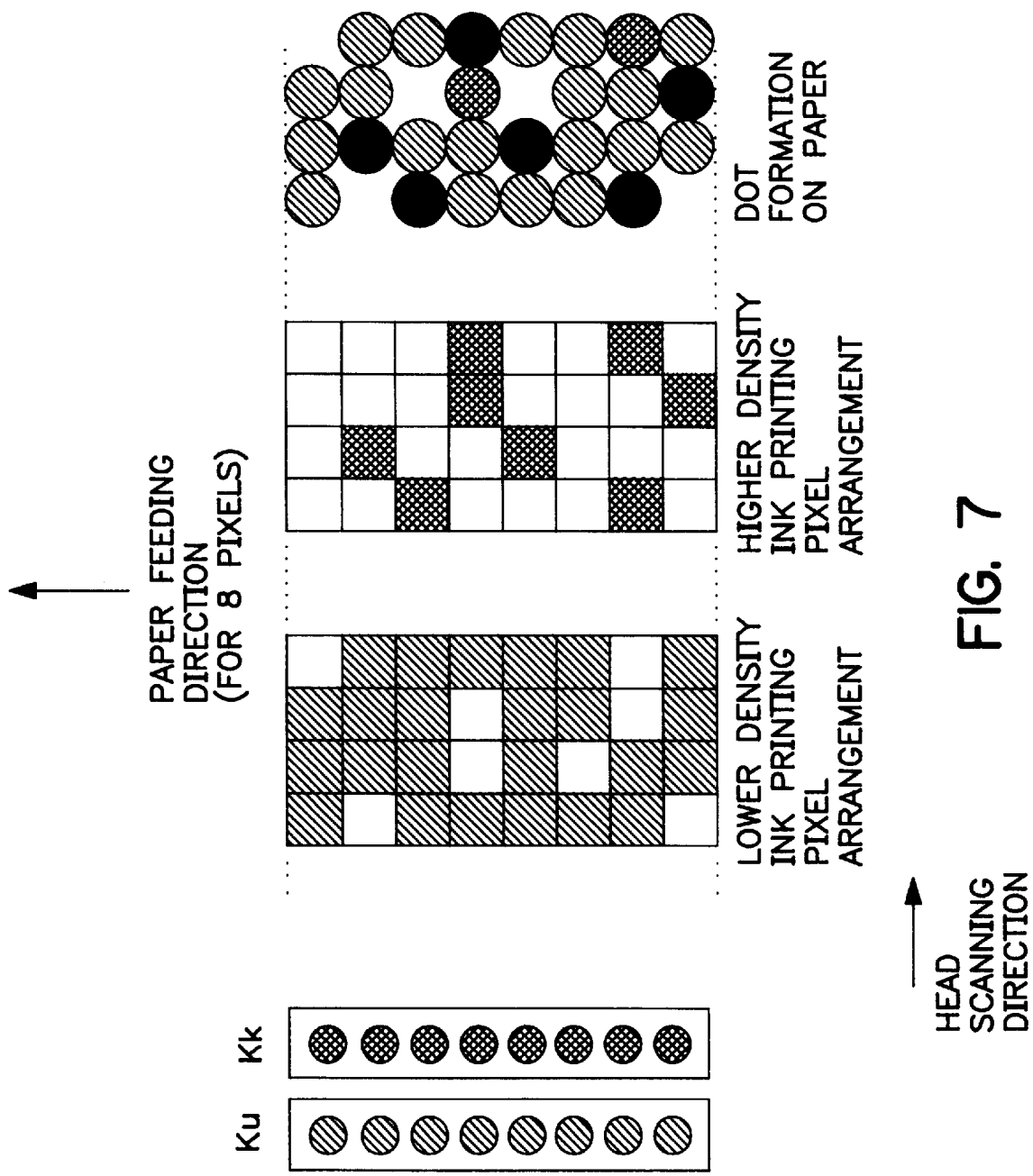
FIG. 7 is an explanatory illustration for explaining printing employing the conventional density dividing.

As can be clear from FIG. 16, the shown embodiment is differentiated from the prior art shown in FIG. 3, in that density dividing and conversion into binary data is not performed, but, instead, the printing signal for respective heads is generated by the circuit 45 performing the above-mentioned conversion process.

It should be noted that the lower density ink employed in the shown embodiment, is determined on a basis of a relationship between an ink dye density and an optical density (hereinafter also referred to as O. D.) shown in FIG. 17. More specifically, the dye concentration in the low density ink is adjusted so that the O.D. value to be realized by the lower density ink becomes an intermediate value between the O.D. on the paper surface and the O.D. to be realized by the higher density ink.

As set forth above, by performing the conversion process into the three level data with respect to the density values of respective pixels, respective pixels have any one of 0, 127 and 255. By setting ejection mode between "non-ejection", "lower density ink ejection" and "higher density ejection" corresponding to those values, dots of respective pixels are printed. More specifically, two kinds of inks of higher and lower densities are adapted to perform printing of dots with the higher density ink when the result of the conversion process into three level data is "255", and with the lower density ink when the result of the conversion process into three level data is "127", respectively. Therefore, lowering of density and/or texture caused by; in the prior art, ejecting the inks of the same color type with different dye concentration to the same pixel can be successfully avoided. Also, by the conversion process into three level data, since error which permits high fidelity reproduction of gradation of density, can be generated, high gradation reproductivity can be maintained with employing the same color type inks with different densities.

It should be noted that in case of using n kinds of the same color type inks with different dye concentrations, a conversion process into n+1 level data has to be performed. In this process, by the following (n+1) equations, the range of the input values relative to the output value $(0, N_1, \ldots, N_{n-1}, 255)$ can be determined.

0: $0 \leq x < (0+N_1)/2$ $N1$: $(0+N_1)/2 \leq x < (N_1+N_2)/2$

Figure 18:
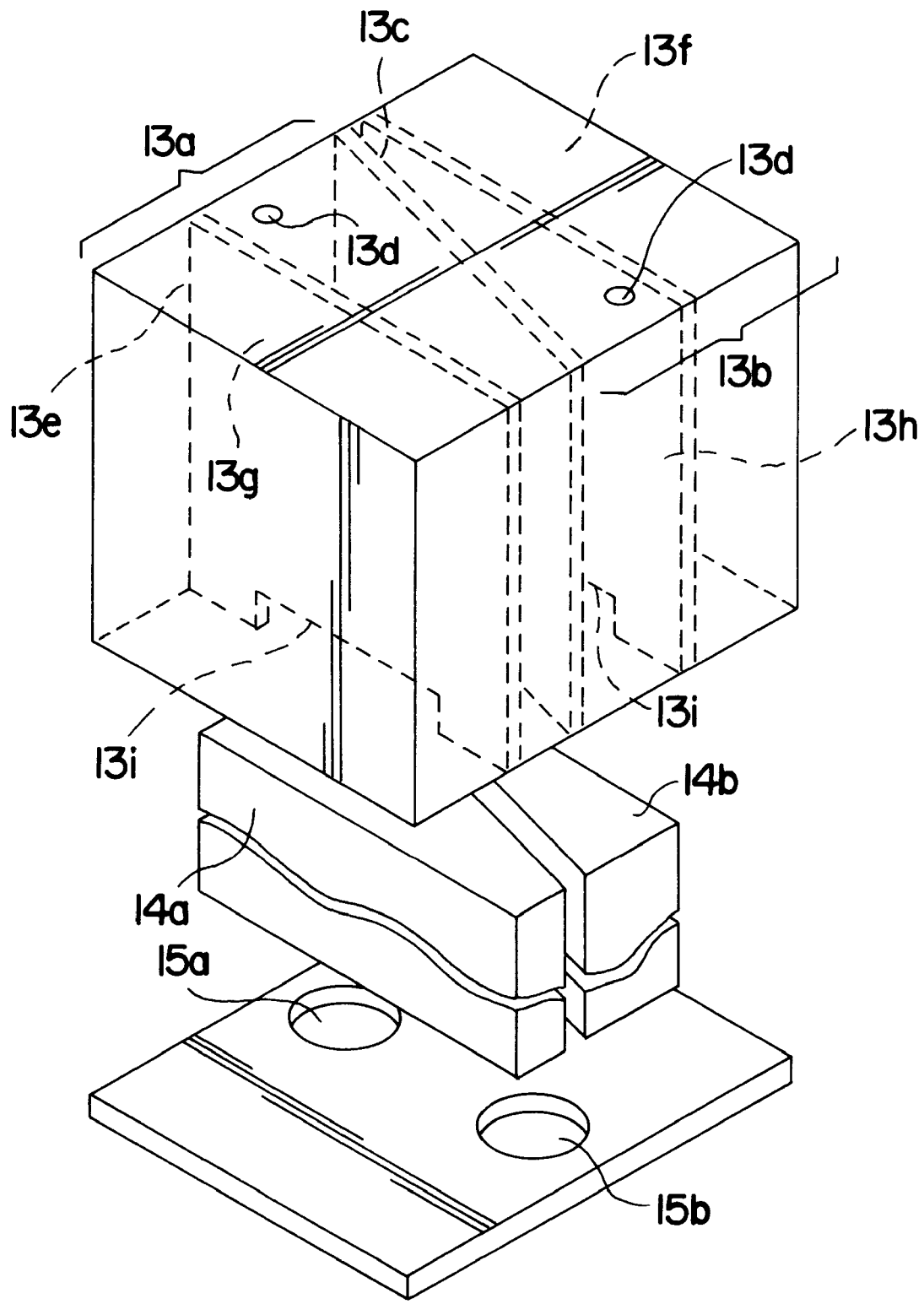
FIG. 18 is a perspective view showing a construction of ink tanks storing higher and lower density inks to be employed in a second embodiment of the present invention.

:

:

:

$Nn-1: (N_{n-2}+N_{n-1})/2 \leq x < (N_{n-1}+255)/2$ $255: (N_{n-1}+255)/2 \leq x \leq 255$ Second Embodiment For an ink in a common liquid chamber or in an ink tank, dye concentration of the ink can be varied by evaporation during non-operation of a printing apparatus, for a long period. Also, in the case that the ink tank has the construction as shown in FIG. 18, more specifically, in the case that an ink chamber 13a for higher density and an ink chamber 13b for a clear ink (ink only containing solvent and not containing dye) are divided by a partitioning wall 13c, and ink density is adjusted by the area ratio of an ink supply openings 15a and 15b, it is possible to cause fluctuation of dye concentration of a supplied ink.

Figure 17:
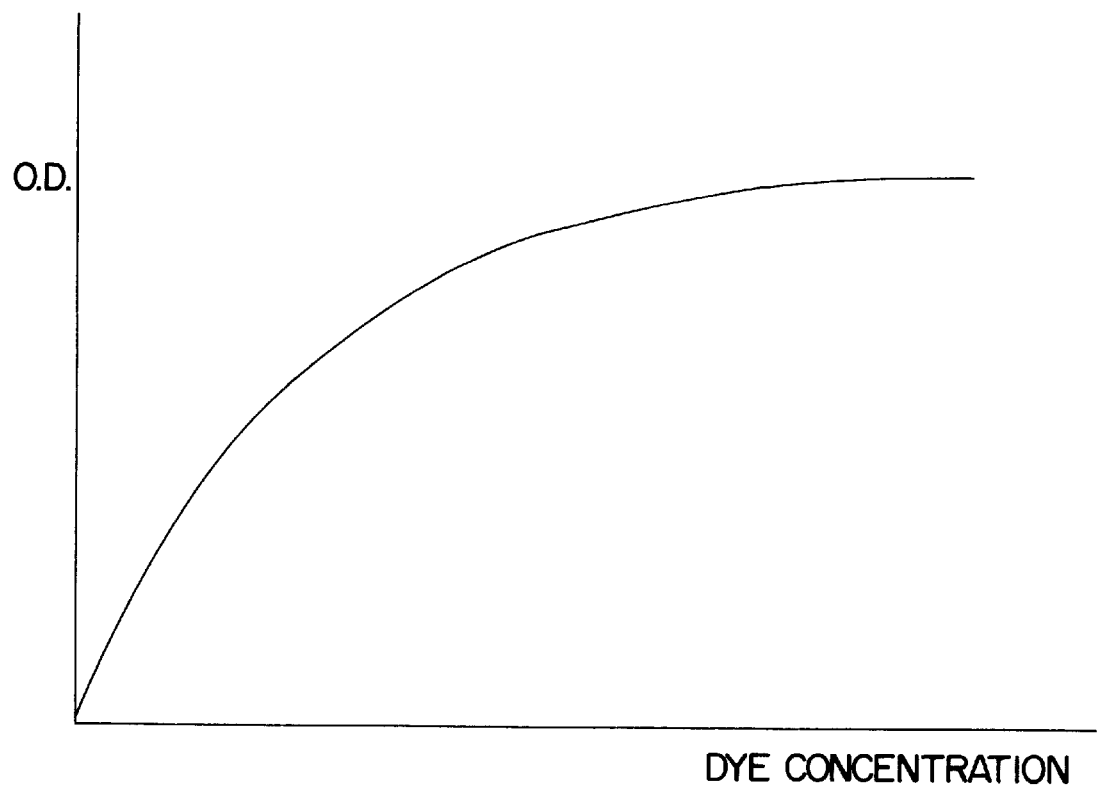
FIG. 17 is a chart showing a relationship between a dye concentration of an ink and an optical density of the ink on a printing medium.

In such case, a relationship between the dye concentration of the ink and the O.D. shown in FIG. 17 cannot be maintained. Then, the O.D. to be obtained for respective pixel cannot be realized to cause differentiation of the output image from the desired image.

Therefore, for example, by providing means for detecting the dye concentration of the ink within the common liquid chamber of the printing head, and resetting the relationship between the input and the output values shown in FIG. 14 in the conversion process into three level data, on a basis of the detected dye concentration, uniform printing image can be constantly obtained.

Figure 19:
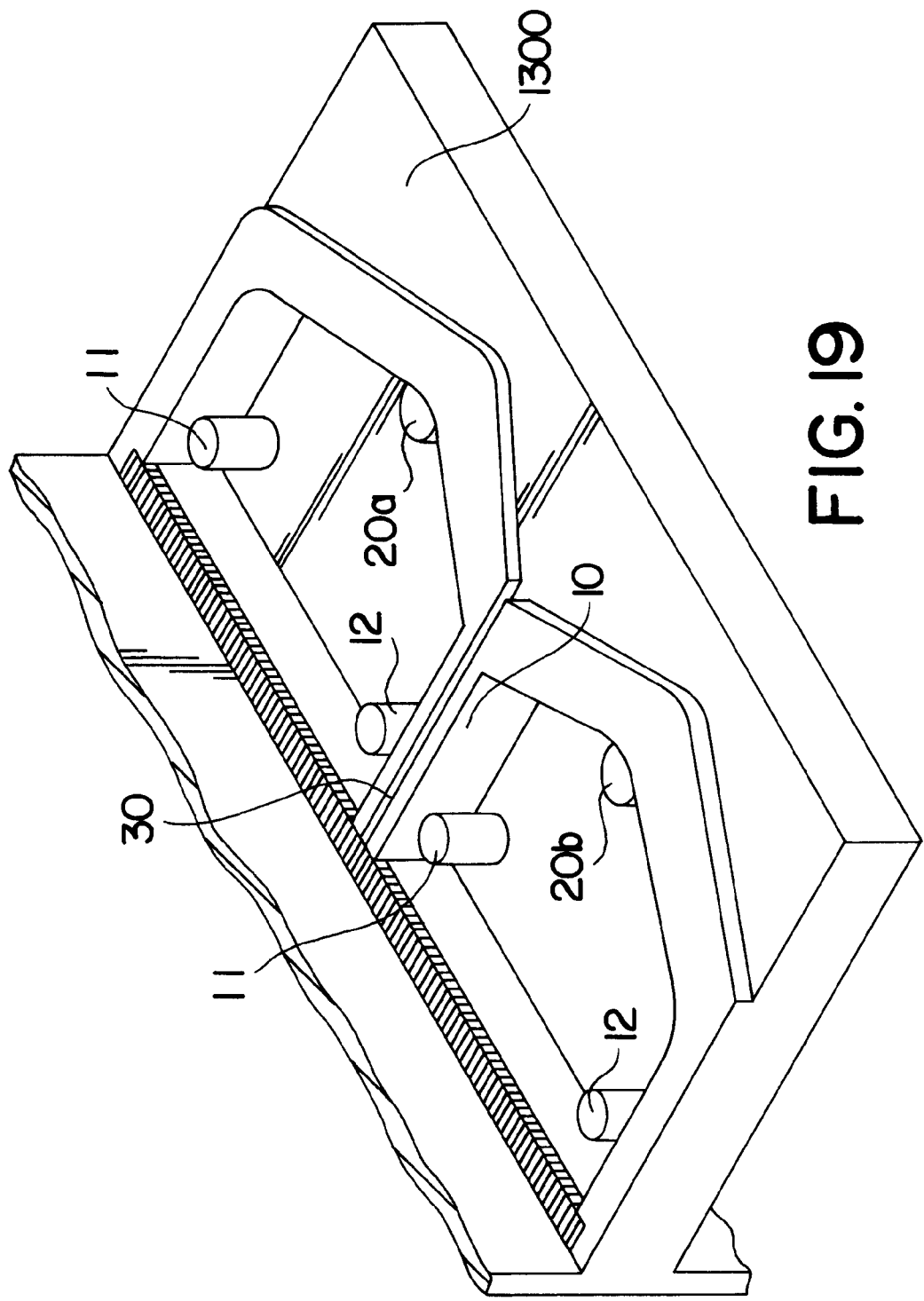
FIG. 19 is an illustration showing a construction for detecting ink density provided in a common liquid chamber of a printing head in the second embodiment.

FIG. 19 is an explanatory illustration showing one example of the means for detecting dye concentration in ink, and shows the common liquid chamber of the printing head similarly to FIG. 10.

In FIG. 19, a reference numeral 11 denotes an ion selective electrode, and a reference numeral 12 denotes a reference electrode.

In general, water-soluble dye to be used in the ink of the ink-jet printing apparatus contains sulfonic acid or carboxylic acid as the soluble radical, and Li ion, Na ion, ammonium ion as the counter-ion. Since the counter-ion is ionized in the solution, the amount can be measured by using the ion selective electrode. Further, since numbers of the counter-ion and dye are proportional, the number of dye can be detected from the measured counter-ion. Then, the dye concentration in the solution can be predicted in a following manner.

In the system shown in FIG. 19, an electromotive force E relative to dissolved constituent j can be generally expressed from Nernst equation:

$$E = E^0 + (RT/n_iF) \log (a_i + K_{ij} a_j^{ni/nj}/a_{i'})$$

Here, $E^0$ is a constant relating to an electrode potential of a comparison electrode or an internal electrode, ni, nj are ion value of i and j, a, a' are amount of sample solution and internal solution of the ion electrode, respectively, $K_{ij}$ is referred as selection coefficient and a constant affecting for ion of j.

Figure 20:
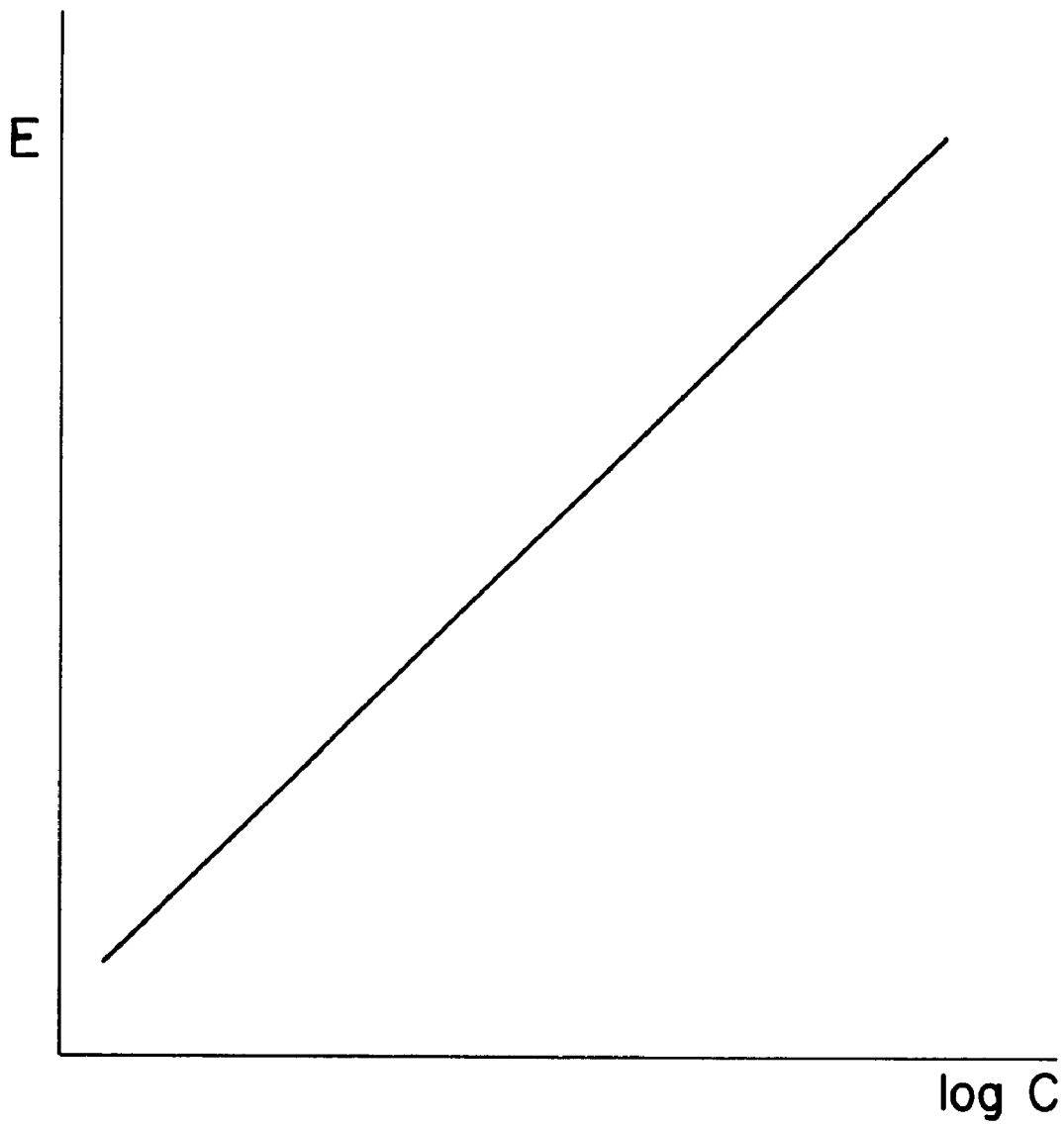
FIG. 20 is a chart showing a relationship between a potential difference E and a dye density C in the second embodiment.

As can be clear from the foregoing equation, the potential E of the ion selective electrode 11 relative to the reference electrode 12 and the dye concentration C have a relationship as illustrated in FIG. 20. From this relationship, the dye concentration in the ink can be predicted from the potential E.

Figure 21C:
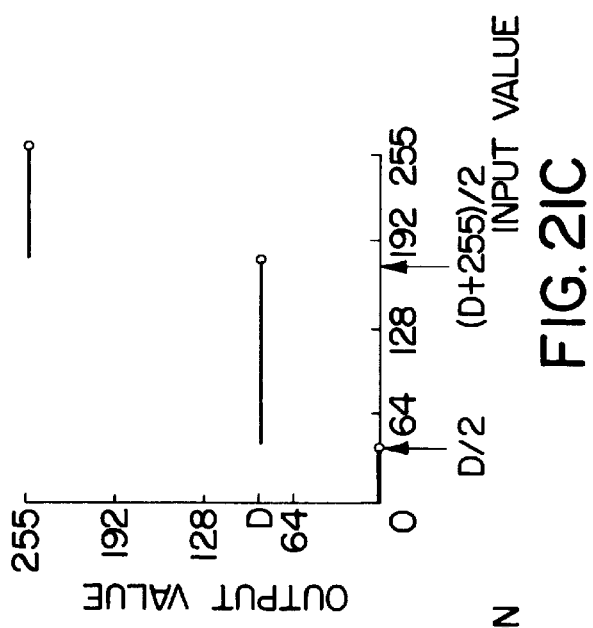
FIGS. 21A to 21C are explanatory illustrations of the process up to deriving an input/output relationship for the conversion process into three level data on a basis of a potential difference A in the second embodiment.
Figure 21B:
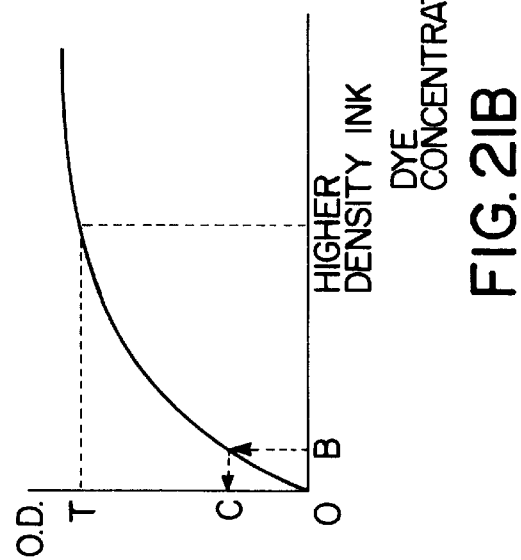
Figure 21A:
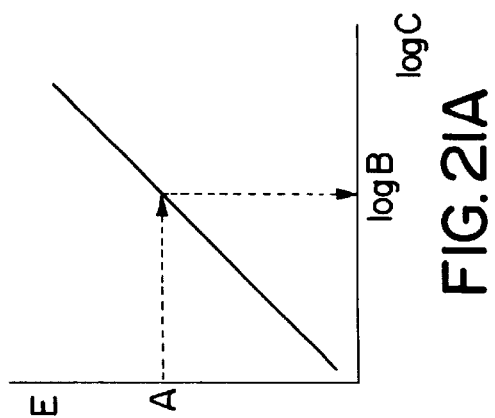

As set forth, since the dye concentration can be predicted from the ion concentration, the output value can be determined on a basis of the relation shown in FIG. 17 between the dye concentration and O.D. For example, when the output value from the ion selective electrode 11 provided in the common liquid chamber is A, B can be obtained as the dye concentration of the ink in the graph representative of relationship shown in FIG. 21A between the potential and the dye concentration. The O.D. corresponding to the dye concentration B becomes C in the relationship between the dye concentration B and the O.D. as shown in FIG. 21B. In this case, assuming the O.D. realized with the higher density ink is T, the output value D corresponding to the O.D. of C becomes (C/T)×255. Therefore, a range of the input value relative to the output value shown in FIG. 21C is varied according to an equation below. Then, the conversion process into three level data can be performed per each pixel in the method shown in the first embodiment. It should be noted that a process shown in FIGS. 21A to 21C can be realized by a process performed by CPU employing a table or so forth.

$0: 0 \leq x < (0+D)/2$ $D: (0+D)/2 \leq x < (D+255)/2$ $255: (D+255)/2 \leq x \leq 255$ By varying the relationship between input and output values to perform the conversion process and detect the dye concentration of the ink, a high quality output image can be constantly obtained irrespective of variation of the dye concentration of the ink.

It should be noted that there may be provided structure such that the relationship between input and output values in the conversion process into three level data is set by a user of the printing apparatus instead of the density detecting means because an additional arrangement for detecting density of ink makes the printing apparatus a high cost one. In this case, the user may provide instructions to set the relationship through an operating switch in the printing apparatus, or through software on a host apparatus connected to the printing apparatus, on a basis of the output image by the printing apparatus. In addition, a printed test pattern may be used for a setting operation of the relationship stated above.

According to the shown embodiment, the relationship between the input and output values in the conversion into three level data can be varied in accordance with variation in dye concentration of the ink. As described above, by using structure for detecting the dye concentration of the ink, an adequate control of the conversion process can be performed so that high quality and high gradation reproduction printing can be performed.

That structure to provide the relationship between the input and output values in the conversion into three level data is varied according to variation in density of printed image is inside the scope of the present invention. In the structure, it is possible that an operation for adjusting the relationship is complicated. However, a printed image having more desirable gradation property can be obtain because the relationship is adjusted on a basis of actually printed image.

Third Embodiment

An original image of an ink-jet printing apparatus for performing multi-level output is mainly an image read by an image scanner or the image on a monitor. Therefore, an original image signal is a luminance signal. In contrast to this, an image on the printing medium output in the ink-jet printing apparatus is treated as density data. Accordingly, it becomes necessary to perform luminance-density conversion for converting the luminance signal of R, G, B on the monitor, for example, into the density signal of C, M, Y, Bk.

Figure 22:
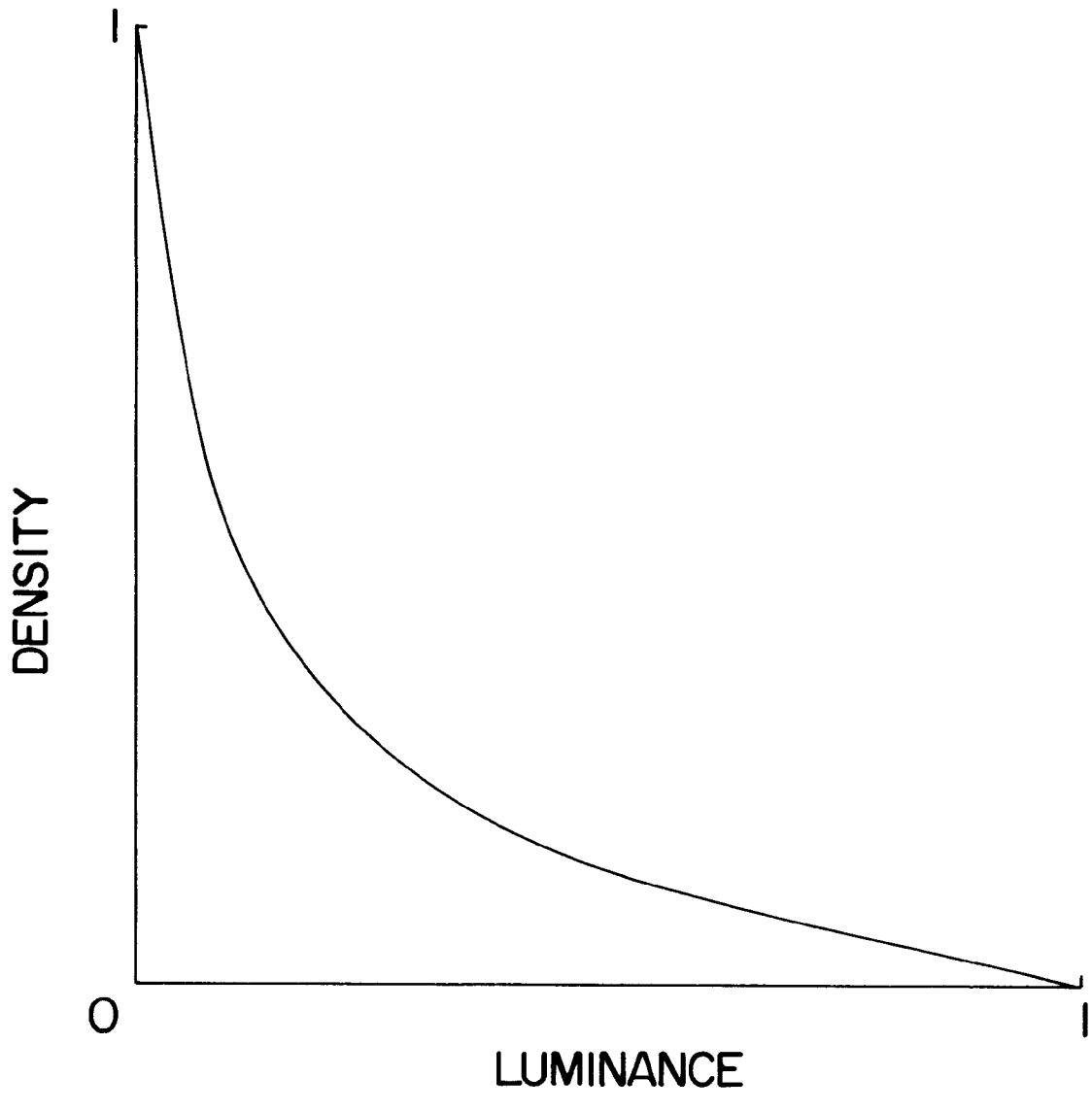
FIG. 22 is a chart showing luminance/density conversion in image signal processing in a third embodiment of the present invention.

In general, the luminance-density conversion is expressed by log conversion as shown in FIG. 22. Accordingly, since both of the luminance and density signals are digital signals, it is possible that the number of gradation steps can be thinned upon conversion from the luminance signal to the density signal. This tendency becomes more significant at greater values (number of gradation steps) of the luminance signal. Therefore, when n-level printing is performed in multi-density printing system employing the same color type inks with different densities, to which system the present invention is applied, gradation reproductivity at n level is decreased at a greater n.

Therefore, in the shown embodiment, the conversion process into n level is not performed with respect to the density signal of C, M, Y, Bk in the printing apparatus, but is performed in the method, shown in the first embodiment with respect to R, G, B luminance signal on the monitor, for example. The ink having dye concentration which can realize the n value of R, G, B luminance signals, densities (O.D.) with respect to the respective luminance signals of n levels, as the output for the luminance signals of n levels, can be set on a basis of the relationship shown in FIG. 17. By performing n level printing, high gradation reproductivity can be attained in the high density portion.

Fourth Embodiment

While the higher gradation reproductivity of an image can be attained at the greater number of the same color type inks with different densities in an ink-jet printing apparatus, liquid passages for supplying a large number of kinds of inks becomes complicate, and a printing head for ejecting such large number of kinds of inks becomes bulky to increase the overall size of a main body of the printing apparatus.

Also, when the n-level printing data is fed for respective of C, M, Y, Bk colors from a host system, for each pixel, with respect to each of C, M, Y, Bk, log2 n (rounding up after the decimal point) bits of signal capacity becomes necessary, which causes a problem in data transmission speed.

As set forth above, even when an attempt is made to perform printing with greater number of the same color ink inks with different densities, there are limitation for the construction or size of the printing apparatus or for data transmission and so forth, number of inks to be used is limited. Therefore, it is typical to perform gradation or multi-tone printing with relatively small number of kinds of inks, as in the first embodiment, for example. The shown embodiment is directed to increase gradation steps in the case of gradation printing with relatively small number of kinds of inks.

Now, consideration is given for the case where two kinds of higher and lower density inks for each color. In this case, since the inks are two-kinds, i.e. the higher density ink and the lower density ink, number of gradation steps to be realized in each pixel is three values, i.e. "not print", "print with the lower density ink" and "print with the higher density ink." A conversion process into three level data is performed for the multi-level input signals by the method in the first embodiment. Either in the case where data of three levels being to be transferred or data of four levels being to be transferred, transfer amount of the data becomes 2 bits respectively for C, M, Y, Bk. Accordingly, in such case, the number of gradation is limited only by constraint in mechanical construction of the printing apparatus, among the constraints set forth above.

Figure 23B:
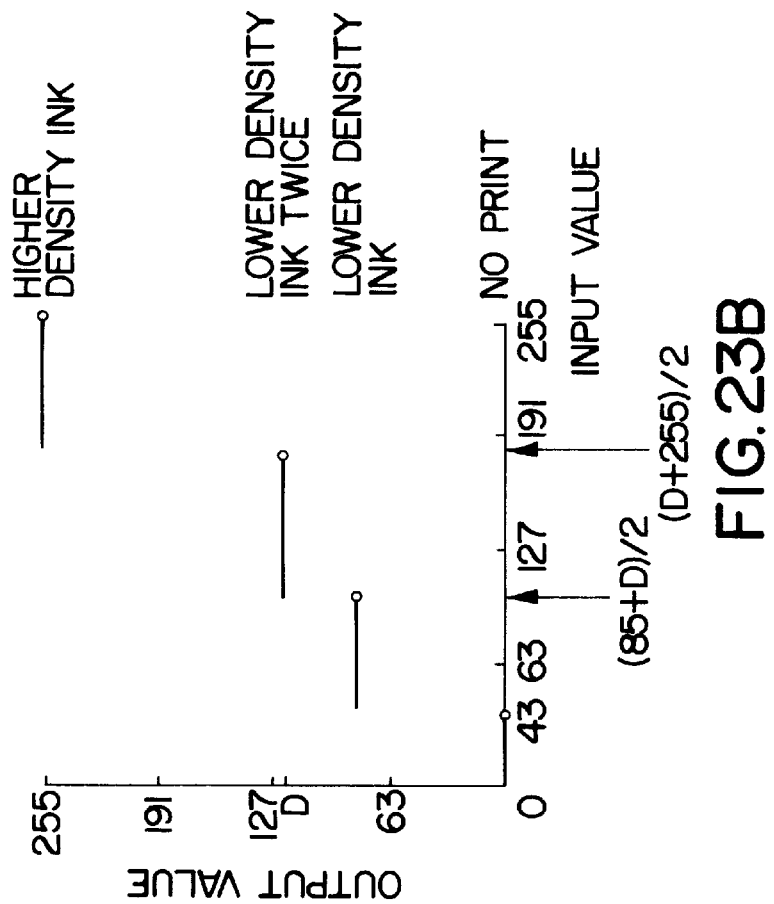
FIGS. 23A and 23B are explanatory illustrations showing an input/output relationship for setting of a dye density of a lower density ink and a conversion process into four level data, in a fourth embodiment of the invention.
Figure 23A:
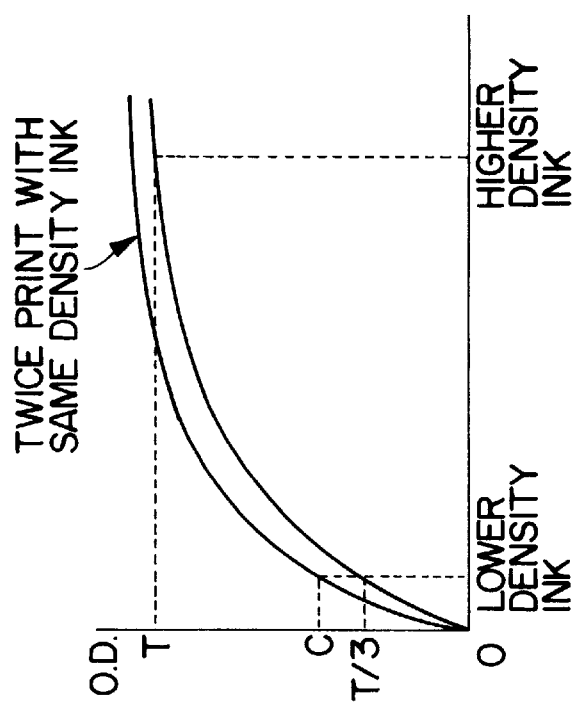

Therefore, under such constraint of mechanical construction, namely constraint to use only two kinds of the same color type inks, in order to express four gradation steps with a greater gradation step number, setting of dye density of respective higher and lower density inks is done as shown in FIGS. 23A and 23B. That is, by printing the lower density ink twice in an overlapping manner, density to be expressed can be increased in one step.

Figure 24A:
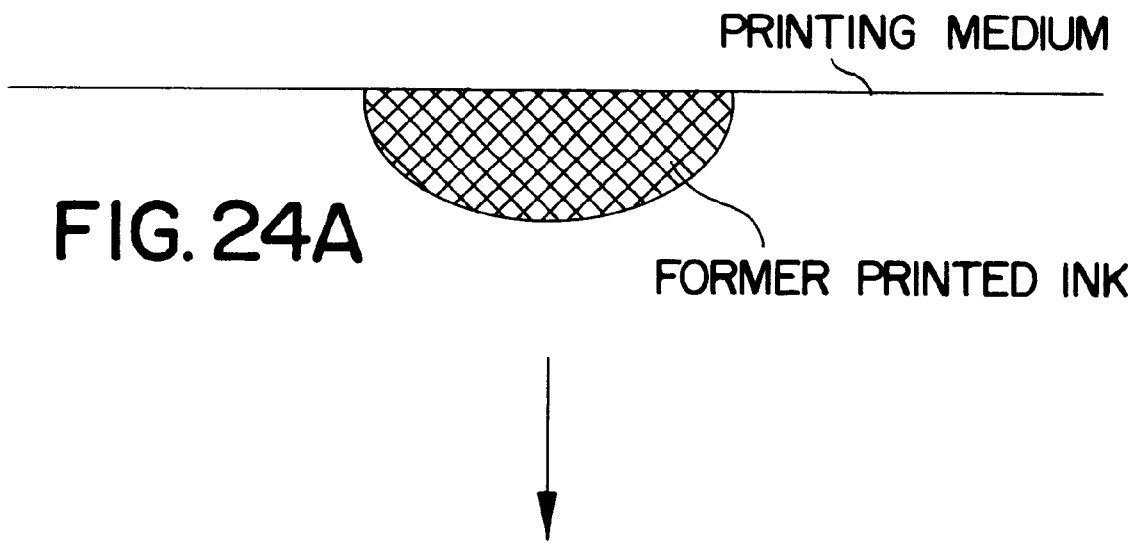
FIG. 24 is an explanatory illustration showing a manner of penetration of the ink into a printing medium when the lower density inks are printing twice on the same pixel in a overlapping manner.
Figure 24B:
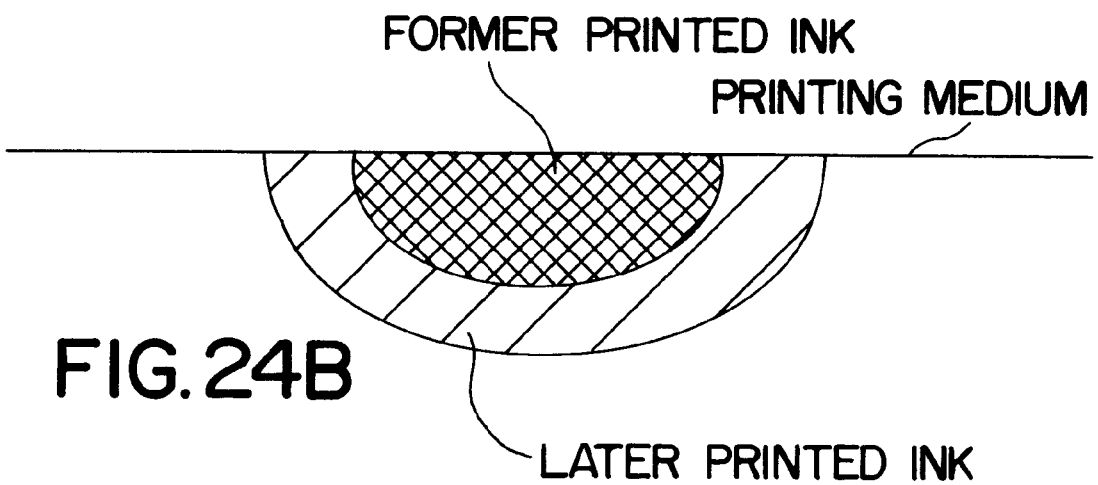

When printing is performed in such method in the prior art, since the ink ejection amount is increased, the printing medium may not receive all of the ejected ink, a long period is taken to receive the ink, or overflow or cockling of ink is caused. Furthermore, even when the inks of the same density are printed in overlapping manner, the later printed ink may penetrate below the former printed ink, as shown in FIG. 24. Thus, the desired density depending upon a number of times of overlapping printing can be obtained to lower image quality.

Figure 25A:
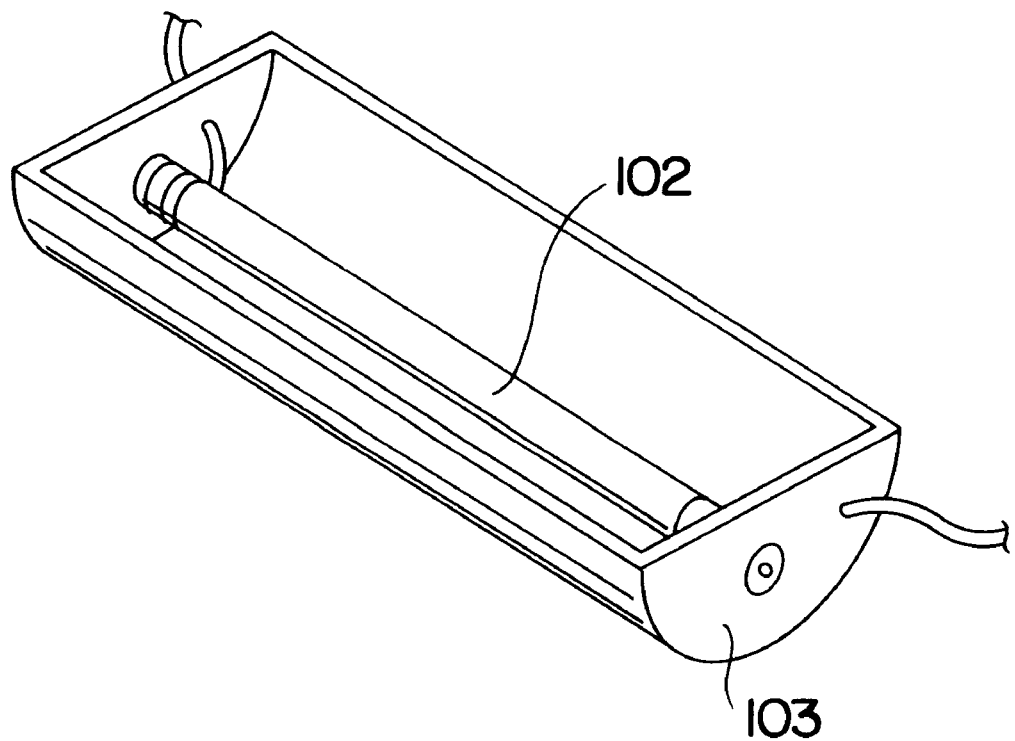
FIGS. 25A and 25B are illustrations showing fixing means.
Figure 25B:
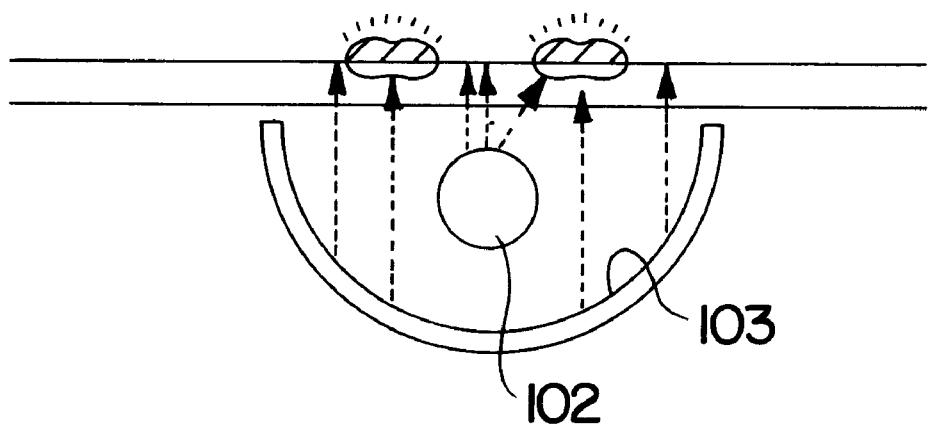
Figure 26A:
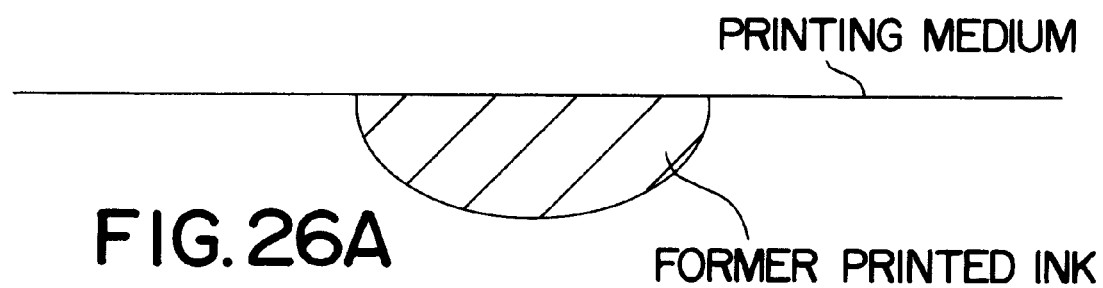
FIG. 26 is an illustration showing manner of penetration of ink into the printing medium when the lower density inks are printing twice on the same pixel in an overlapping manner, utilizing the fixing means.
Figure 26B:
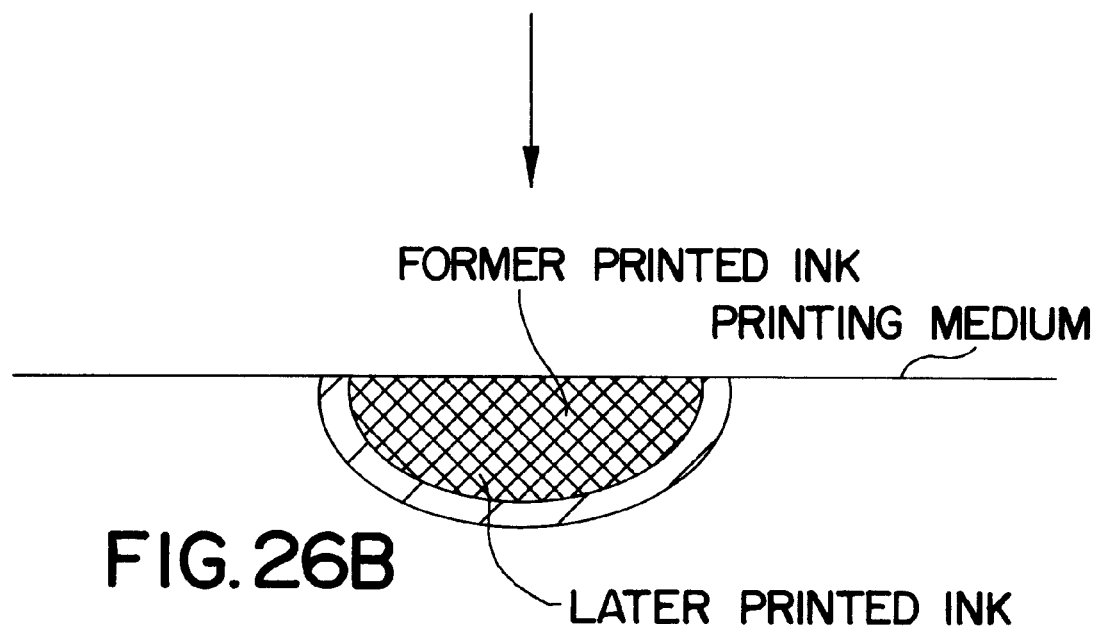

In order to prevent lowering of the image quality, a fixing device shown in FIGS. 25A and 25B can be employed. In FIGS. 25A and 25B, a reference numeral 102 denotes an infrared heater and a reference numeral 103 denotes a reflection plate. By employing the fixing device, drying of ink can be promoted. Also, at a portion to be printed in overlapping manner, the former printed ink can be dried and fixed before the later printed ink is ejected as shown in FIG. 26. By this, since the printing medium, upon ejection of the later printing ink, is unchanged to the condition before printing. Therefore, the later printed ink may penetrate in the portion where the former printed ink penetrated. As a result, it becomes possible to certainly realize the O.D. equivalent to the O.D. when the dye concentration in the ink becomes double.

Figure 27B:
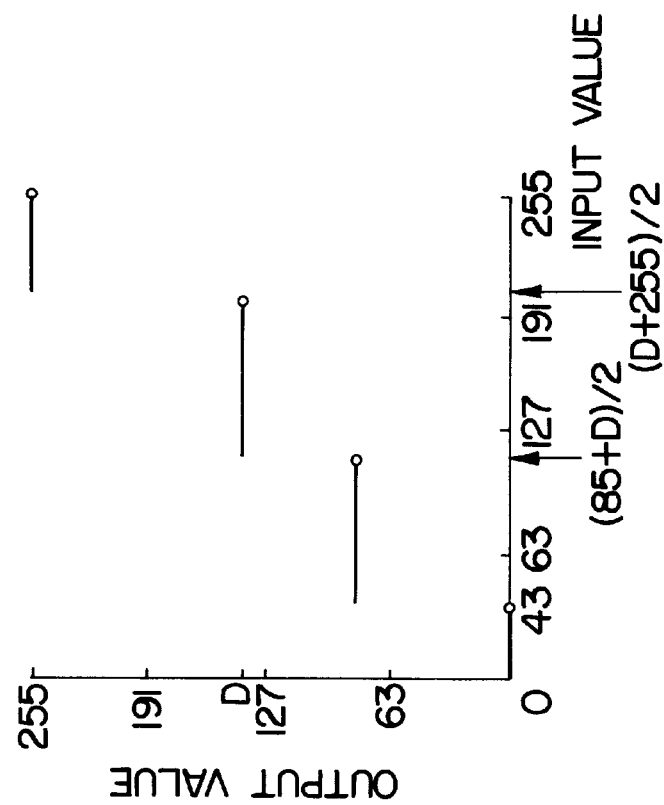
FIGS. 27A and 27B are charts showing relationship between a dye density and an optical density and the conversion process into four level data in the case that the fixing means is employed.
Figure 27A:
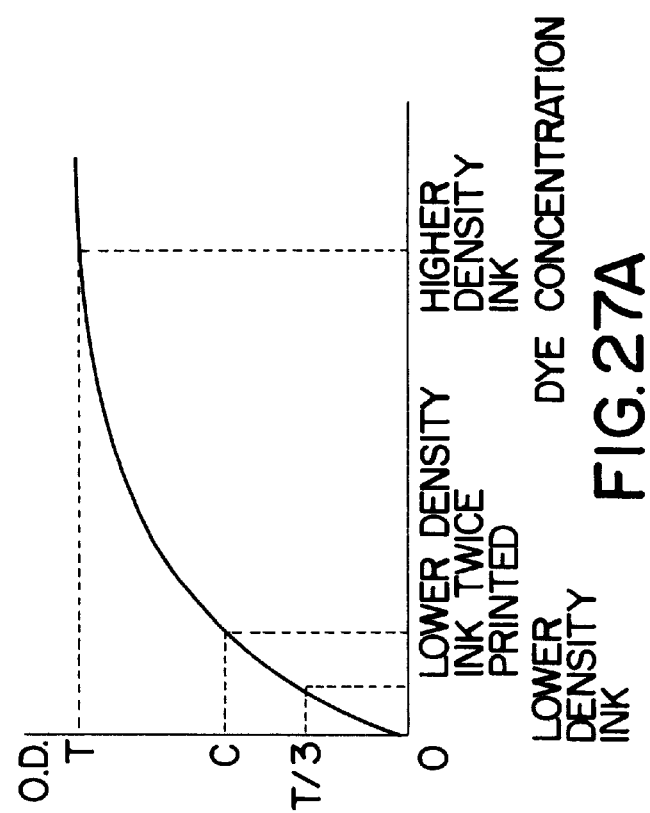

By employing such fixing device, a relationship between dye density and O.D. and relationship between a input density value and a output density value in the conversion process into four level data are determined as shown in FIGS. 27A and 27B, and lowering of density by printing of dots twice can be suppressed. As a result, in four gradation level printing, the density difference of the printed pixel expressing each gradation levels can be made closer to be uniform, and thus, smooth gradation expression can be possible.

Further, since the ink can be dried and fixed immediately after hitting the printing medium, it can successfully prevent the overflow of the ink for incapability of receiving of the ink in the printing medium, and the degradation of the precision of hitting position due to cockling. Therefore, problems associated with printing with the ink twice, can be avoided. As a result, the number of gradation levels greater than number of kinds of the inks determined by constraint of the printing apparatus, can be expressed.

It should be noted that the entire foregoing example has been discussed with respect to an example for four gradation levels by overlapping of the lower density ink twice, similar effect can be obtained by taking the manner of the first and second embodiments by overlapping the lower density inks for a plurality of times or by overlapping the lower density ink and the higher density ink to obtain good quality of image.

The present invention achieves a distinct effect when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows; first, one or more drive signals are applied to the electrothermal transducers to cause thermal energy corresponding to recording information; second, the thermal energy induces sudden temperature rise that exceeds the nucleate boiling so as to cause film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated into the present invention: this structure includes heating portions disposed on bent portions in addition to a combination of the ejection orifices, liquid passages and the electrothermal transducers disclosed in the above patents. Moreover, the present invention can be applied to structures disclosed in Japanese Laid Open Patent Application Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

As set forth above, with respective embodiments, when a certain pixel is to be recorded, n−1 kinds of inks with different densities can correspond to one of the levels in the conversion process into n level data without causing overlapping, the inks with different densities will never be printed in overlapping manner. As a result, no local density difference due to overlapping printing of the inks is ever cased over the overall image region to successfully avoid specific density fluctuation (texture). Thus, high quality printing can be performed.

What is claimed is:

1. An ink-jet printing apparatus performing printing on a printing medium by using a printing head having a plurality of ejection portions respectively ejecting a plurality of kinds of the same color type inks with mutually different densities, said number of the plurality of kinds of the same color type inks being n (wherein n is an integer greater than or equal to 2), comprising:

data processing means for processing a printing data for each pixel to generate ejection data for each pixel in a manner that a conversion process for converting printing data for each pixel into k level data (wherein k is an integer greater than or equal to n+1) is performed based on a threshold value and a result of said conversion process is setting election data for a ejecting portion ejecting one of the n kinds of the same color type inks, and the one of the n kinds of the same color type inks corresponds to one level obtained by the conversion process into k level data, and said ejection data being that the same color type inks of different densities are not ejected in an overlapping manner;

head driving means for driving the printing head for performing the ejection on a basis of the ejection data generated by said data processing means; and varying means for varying the threshold value for the conversion process by said data processing means in accordance with a dye concentration of the ink.

2. An ink-jet printing apparatus as claimed in claim 1 wherein said data processing means includes means for distributing an error between the printing data and the result of the conversion process to the printing data for other pixels, said error being caused in the conversion process into k level data.

3. An ink-jet printing apparatus as claimed in claim 2, wherein k=n+1.

4. An ink-jet printing apparatus as claimed in claim 3, wherein said data processing means performs the conversion process into k level data for the printing data as R, G, B luminance signals and said data processing means sets a result of said conversion process as the ejection data for the ejecting portion ejecting the ink having a density corresponding to one of levels which is obtained by said conversion process for the luminance signals.

5. An ink-jet printing apparatus as claimed in claim 3, wherein the printing head comprises a thermal energy generating element for generating a thermal energy to be used for ejecting the ink.

6. An ink-jet printing apparatus as claimed in claim 2, wherein said data processing means sets the ejection data for ejecting the same density ink for a plurality of times on the same pixel as the ejection data for the ejecting portion.

7. An ink-jet printing apparatus as claimed in claim 6, further comprising means for fixing the ink on the printing medium.

8. An ink-jet printing apparatus as claimed in claim 7, wherein k=n+2.

9. An ink-jet printing apparatus as claimed in claim 1, further comprising detecting means for detecting a dye concentration of the ink, wherein said varying means varies the threshold value depending upon the dye concentration of the ink detected by said detecting means.

10. An ink-jet printing apparatus as claimed in claim 1, further comprising input means through which a user of said ink-jet printing apparatus inputs instructions, wherein said varying means varies the threshold value depending upon the instructions input through said input means.

11. An ink-jet printing apparatus as claimed in claim 1 wherein said varying means varies the threshold value depending upon a density of an image printed by said ink-jet printing apparatus.

12. An ink-jet printing method performing printing on a printing medium by using a printing head having a plurality of ejection portions respectively ejecting a plurality of kinds of the same color type inks with mutually different densities, said number of the plurality of kinds of the same color type inks being n (wherein n is an integer greater than or equal to 2), comprising the steps of:

processing a printing data for each pixel to generate ejection data for each pixel in a manner that a conversion process for converting print data for each pixel into k level data (wherein k is an integer greater than or equal to n+1) is performed based on a threshold value and a result of said conversion process is setting the ejection data for a ejecting portion ejecting one of the n kinds of the same color type inks, and the one of the n kinds of the same color type inks corresponds to one level obtained by the conversion process into k level data, and said ejection data being that the same color type inks of different densities are not ejected in an overlapping manner;

driving the printing head for performing ejection on a basis of the ejection data generated in said step for processing a printing data; and varying the threshold value for the conversion process in said processing step in accordance with dye concentration of the ink.

13. An ink-jet printing method as claimed in claim 12 wherein said step for processing the printing data includes a step for distributing an error between the printing data and the result of the conversion process to the printing data for other pixels, said error being caused in the conversion process into k level data.

14. An ink-jet printing method as claimed in claim 13, wherein k=n+1.

15. An ink-jet printing method as claimed in claim 14, wherein said conversion processing step performs the conversion process into k level data for the printing data as R, G, B luminance signals and said data processing step sets a result of said conversion process as ejection data for the ejecting portion ejecting the ink having density a corresponding to one of the levels obtained by said conversion process for the signals.

16. An ink-jet printing method as claimed in claim 14, wherein the printing head comprises a thermal energy generating element for generating a thermal energy to be used for ejecting the ink.

17. An ink-jet printing method as claimed in claim 13, wherein said step for processing the printing data sets the ejection data for ejecting the same density ink for a plurality of times on the same pixel as the ejection data for the ejecting portion.

18. An ink-jet printing method as claimed in claim 17, which further comprising a step of fixing the ink on the printing medium.

19. An ink-jet printing method as claimed in claim 18, wherein k=n+2.

20. An ink-jet printing method as claimed in claim 12, further comprising a detecting step for detecting a dye concentration of the ink, wherein said varying step varies the threshold value depending upon the dye concentration of the ink detected in said detecting step.

21. An ink-jet printing method as claimed in claim 12, further comprising an input step through which a user inputs instructions, wherein said varying step varies the threshold value depending upon the instructions input in said input step.

22. An ink-jet printing method as claimed in claim 12, wherein said varying step varies the threshold value depending upon the density of an image printed by said ink-jet printing method.

23. A production method of producing a printing product, printed by using a plurality of kinds of the same color type inks with mutually different densities, the method comprising, performing a conversion process into k level data using a threshold value, the threshold value being varied in accordance with a dye concentration of the ink, wherein each pixel of said printing product is not formed with the same color types of inks having different densities in overlapping manner.

* * * * *

UNITED STATES PATENT AND TRADEMARK OFFICE
CERTIFICATE OF CORRECTION

PATENT NO. : 6,079,824
DATED : June 27, 2000
INVENTOR(S) : FUMIHIRO GOTOH It is certified that error appears in the above-identified patent and that said Letters Patent is hereby corrected as shown below:

ON THE TITLE PAGE

[54] Title, "PLURALITY" should read --PLURALITY OF--.

COLUMN 1

Line 2, "PLURALITY" should read --PLURALITY OF--;
    Line 17, "a" should read --an--; and "apparatus," should read --apparatuses,--; and
    Line 18, "apparatuses" should read --apparatus--.

COLUMN 3

Line 8, "conversion.." should read --conversion.--.

COLUMN 5

Line 61, "A" should read --a--.

COLUMN 8

Line 1, "a" should read -an--.

COLUMN 18

Line 14, "temperature adjusted" should read --temperature-adjusted--.

UNITED STATES PATENT AND TRADEMARK OFFICE
CERTIFICATE OF CORRECTION

PATENT NO. : 6,079,824
DATED : June 27, 2000
INVENTOR(S) : FUMIHIRO GOTOH

It is certified that error appears in the above-identified patent and that said Letters Patent is hereby corrected as shown below:

COLUMN 19

Line 2, "election" should read --ejection--; and
    "a" should read --an--; and
    Line 4, "the" (first occurrence) should be deleted.

COLUMN 20

Line 2, "a" should read --an--;
    Line 3, "the" (second occurrence) should be deleted;
    Line 28, "density a" should read --a density--; and
    Line 40, "comprising" should read --comprises--.

Signed and Sealed this

Eighth Day of May, 2001

Attest:

NICHOLAS P. GODICI

Attesting Officer     Acting Director of the United States Patent and Trademark Office